US012491844B2

(12) United States Patent
Belluccia et al.

(10) Patent No.: US 12,491,844 B2
(45) Date of Patent: Dec. 9, 2025

(54) COMPACT OUTRIGGER DEVICE

(71) Applicant: Altec Industries, Inc., Birmingham, AL (US)

(72) Inventors: Nicholas Belluccia, Roanoke, VA (US); James A. Downing, Salem, VA (US); Bryan Plunkett, Roanoke, VA (US); Matt Tolley, Salem, VA (US); Harold Davidson, Elizabethtown, KY (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 18/435,394

(22) Filed: Feb. 7, 2024

(65) Prior Publication Data
US 2025/0249869 A1    Aug. 7, 2025

(51) Int. Cl.
*B60S 9/12*    (2006.01)

(52) U.S. Cl.
CPC ...................................... *B60S 9/12* (2013.01)

(58) Field of Classification Search
CPC ...... B60S 9/02; B60S 9/10; B60S 9/12; B60S 9/22; B60S 9/20
See application file for complete search history.

(56) References Cited

U.S. PATENT DOCUMENTS

| | | | |
|---|---|---|---|
| 3,716,252 A | 2/1973 | Johnson | |
| 3,843,154 A | 10/1974 | Thompson | |
| 3,871,685 A * | 3/1975 | Senelet | E02F 9/085 280/766.1 |
| 4,061,309 A * | 12/1977 | Hanser | B60S 9/10 254/423 |
| 4,921,732 A * | 5/1990 | Bounds | B05B 12/122 427/325 |
| 5,387,071 A * | 2/1995 | Pinkston | B60P 3/125 280/765.1 |
| 5,913,525 A * | 6/1999 | Schneider | B60S 9/12 116/DIG. 13 |
| 7,150,472 B1 | 12/2006 | Schneider | |
| 7,182,163 B1 * | 2/2007 | Gipson | B60S 9/20 180/8.5 |
| 7,331,607 B1 | 2/2008 | Schneider | |
| 7,594,679 B1 | 9/2009 | Schneider | |
| 8,696,025 B2 * | 4/2014 | Forini | B66C 23/80 280/765.1 |
| 8,944,466 B2 | 2/2015 | St-Yves et al. | |

(Continued)

FOREIGN PATENT DOCUMENTS

| | | | | |
|---|---|---|---|---|
| DE | 29918438 U1 * | 1/2000 | | B60S 9/04 |
| JP | 3392248 B2 | 3/2003 | | |

(Continued)

*Primary Examiner* — John Olszewski
(74) *Attorney, Agent, or Firm* — Erise IP, P.A.

(57) ABSTRACT

An outrigger assembly for a utility vehicle configured to provide stability to a utility vehicle. The outrigger assembly comprising: a first leg assembly, a second leg assembly, and a plurality of actuators for transitioning the outrigger between a plurality of configurations. The plurality of configurations configured to facilitate any of providing stability to a utility vehicle, reducing obstruction during deployment, stowing inside of a maximum width and a maximum height of the utility vehicle, and increasing ground penetration of deployed outrigger leg assemblies.

20 Claims, 13 Drawing Sheets

(56) References Cited

U.S. PATENT DOCUMENTS

| | | | |
|---|---|---|---|
| 9,567,728 B2* | 2/2017 | Colbert | E02F 9/085 |
| 10,124,773 B1* | 11/2018 | Mourlam | B60S 9/12 |
| 10,549,960 B2 | 2/2020 | Moose et al. | |
| 2008/0142768 A1* | 6/2008 | Thorpe | B60S 9/12 |
| | | | 254/423 |
| 2013/0074377 A1* | 3/2013 | Colbert | E02F 9/085 |
| | | | 280/765.1 |
| 2018/0215354 A1* | 8/2018 | Linsmeier | E06C 5/04 |

FOREIGN PATENT DOCUMENTS

| | | |
|---|---|---|
| JP | H10100871 B | 6/2005 |
| WO | 2018052149 A1 | 3/2018 |

* cited by examiner

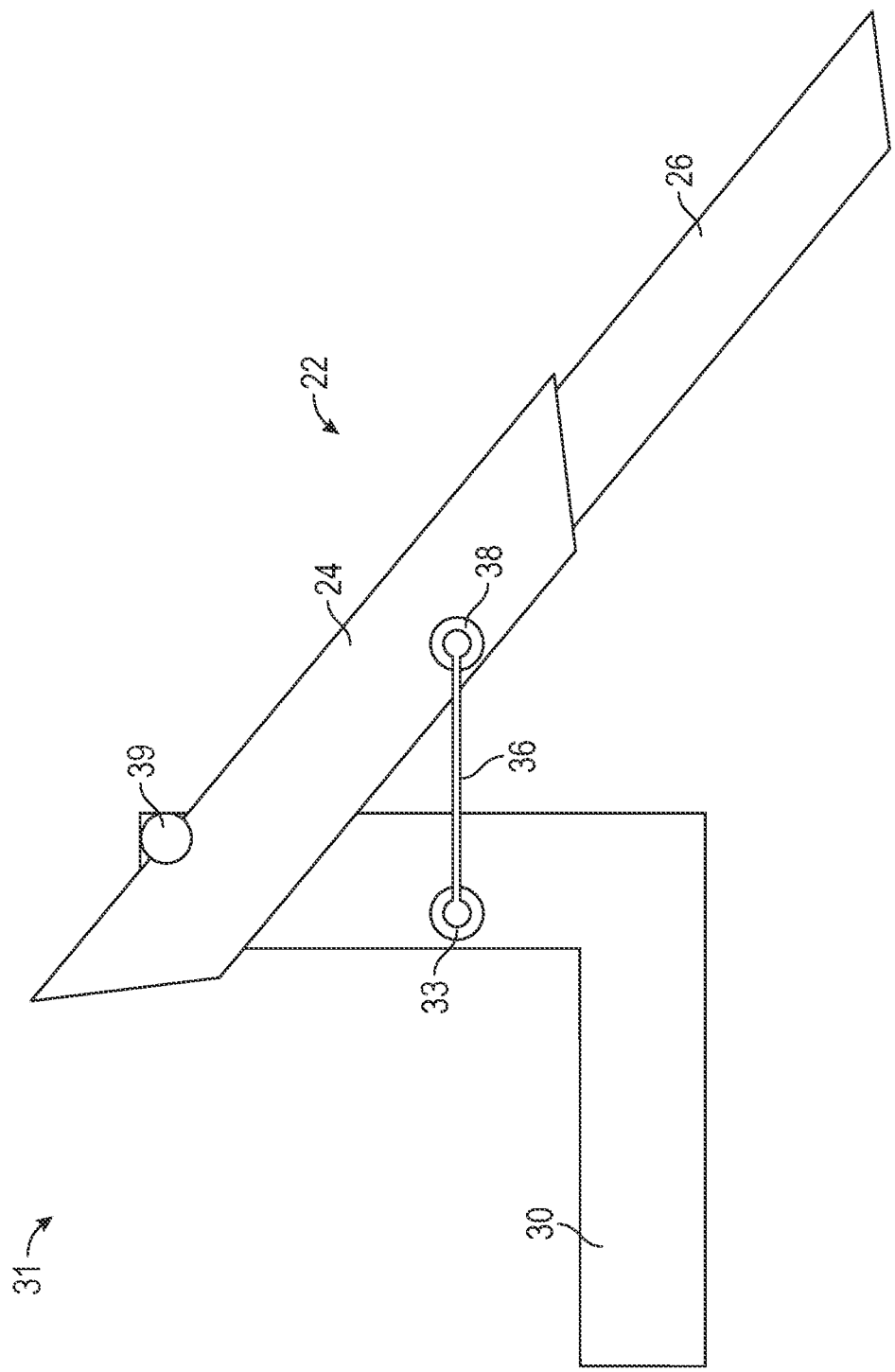

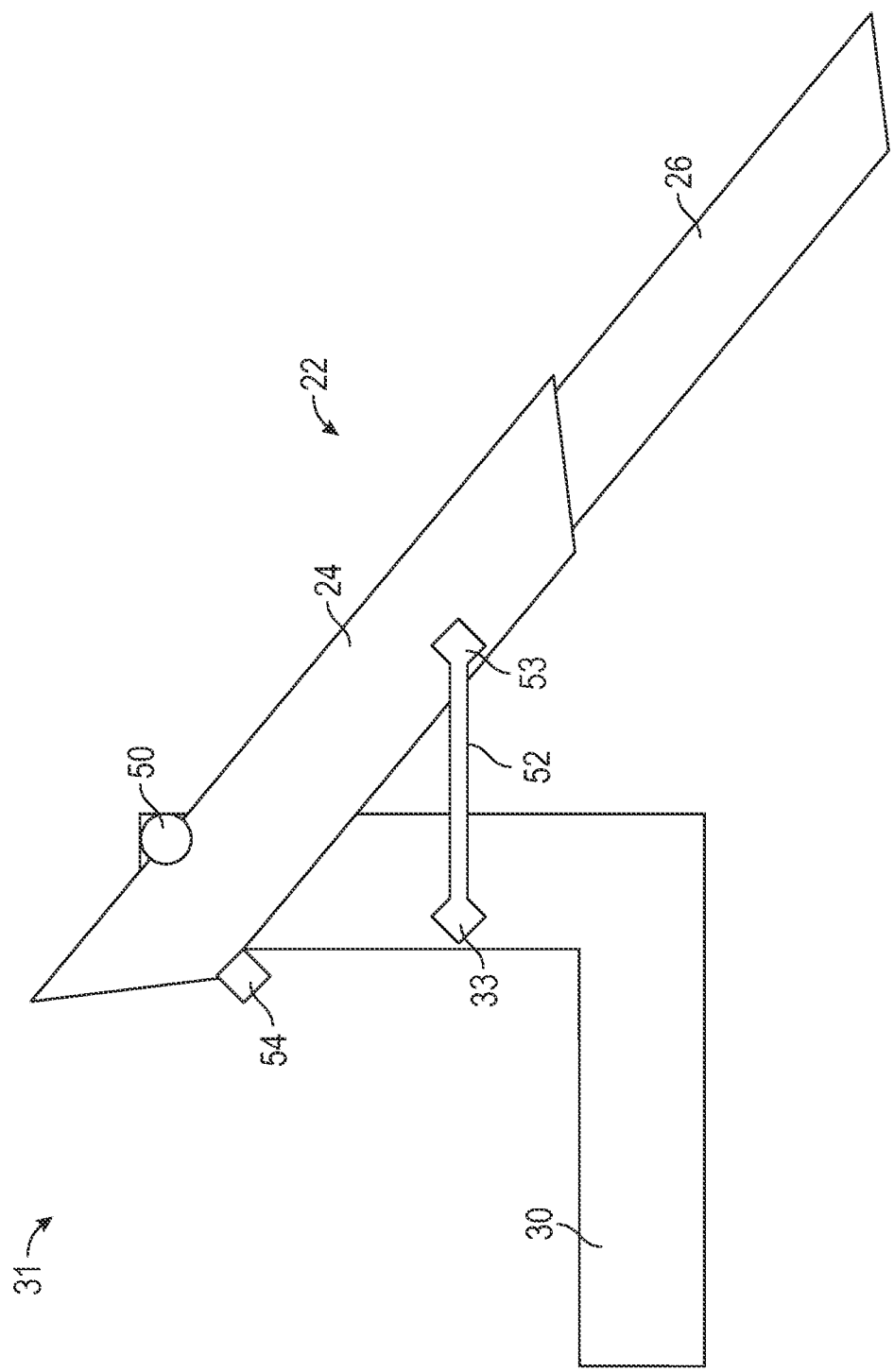

COMPACT OUTRIGGER DEVICE

BACKGROUND

1. Field

Embodiments of the present disclosure generally relate to outriggers. More specifically, embodiments of the present disclosure relate to providing stability to utility vehicles by using one or more compact outrigger devices.

2. Related Art

Outriggers are generally utilized for utility vehicles to help provide stability to the utility vehicles while performing operations. Some common types of utility vehicles include digger derricks, boom truck cranes, aerial devices, cable handlers, and work trucks. Many utility vehicles provide specialized services that may require extra stabilization. Outriggers generally provide stabilization to the vehicles using legs that provide pressure to the ground beneath. Current outriggers struggle to provide a suitable penetration depth during operation while simultaneously being able to stow away within a maximum width and maximum height of the utility vehicle for transportation.

Radial outriggers provide stability to utility vehicles using two pivoting legs that are stowed in an upright position. While in the upright position, the radial outriggers are stowed within the maximum width and maximum height of the utility vehicle. Current radial outriggers provide suitable ground penetration and a wider spread for stability but require an excess of room to deploy. As such, radial outriggers require sufficient clearance on each side of the utility vehicle to deploy correctly. Radial outriggers deploy from an upright position and swing downwards to deploy. As such, radial outriggers are susceptible to setup obstructions.

Current out-and-down outriggers provide stability to utility vehicles using two extendible legs. Out-and-down outriggers allow for setup flexibility that allows a user to change the spread width of the outrigger. Out-and-down outriggers also provide suitable ground penetration while retaining the ability to stow away within the maximum width and maximum height of the utility vehicle. However, out-and-down outriggers cause a job site obstruction that can prove dangerous to users who are required to walk around the legs of the out-and-down outriggers when deployed.

Current A-frame outriggers provide stability to utility vehicles using two legs that deploy at an angle of about 45 degrees with the ground when deployed. A-frame outriggers are popular for their ease of use and lack of obstructions during setup and while deployed. However, A-frame outriggers provide a relatively smaller spread compared to the above-mentioned outriggers, as well as worse ground penetration when compared to other outrigger styles. Accordingly, existing forms of outriggers lack simplicity of operation, the ability to stow within the maximum width and maximum height of the vehicle, user flexibility during setup, and ample stability with increased ground penetration and/or wider spread. Further, existing forms of outriggers generate obstructions while deployed that hinder the operating environment.

SUMMARY

Embodiments of the present disclosure solve the above-mentioned problems by providing a system, method, and outrigger device for any of providing stability to a utility vehicle, reducing obstruction during deployment, stowing inside of a maximum width and a maximum height of the utility vehicle, and increasing ground penetration of deployed outrigger leg assemblies. The outrigger devices described herein provide an increased penetration depth and user flexibility while retaining the ability to stow away within the maximum width and maximum height of the utility vehicle. In some embodiments, the outrigger device comprises a first leg assembly, a second leg assembly, and a plurality of actuators for transitioning the outrigger between a plurality of configurations. Further, in some embodiments, the plurality of configurations facilitates any of providing stability to a utility vehicle, reducing obstruction during deployment, stowing inside of the maximum width and maximum height of the utility vehicle, and increasing ground penetration of deployed outrigger leg assemblies.

In some embodiments, the techniques described herein relate to an outrigger assembly configured to be removably attached to a utility vehicle, the outrigger assembly including: a first leg assembly including a first upper portion and a first lower portion, the first leg assembly rotatably coupled to the utility vehicle at the first upper portion; a first tilt actuator configured to transition the first leg assembly between a stowed configuration and an out configuration, wherein the first leg assembly is stowed within a maximum width and a maximum height of the utility vehicle in the stowed configuration, wherein the first leg assembly is rotated away from the utility vehicle in the out configuration; a first extension actuator configured to transition the first leg assembly between the out configuration and a fully deployed configuration, wherein the first leg assembly is rotated away from the utility vehicle and at least partially in contact with a ground surface in the fully deployed configuration; a second leg assembly including a second upper portion and a second lower portion, the second leg assembly rotatably coupled to the utility vehicle at the second upper portion; a second tilt actuator configured to transition the second leg assembly between the stowed configuration and the out configuration, wherein the second leg assembly is stowed within the maximum width and the maximum height of the utility vehicle in the stowed configuration, wherein the second leg assembly is rotated away from the utility vehicle in the out configuration; and a second extension actuator configured to transition the second leg assembly between the out configuration and the fully deployed configuration, wherein the second leg assembly is rotated away from the utility vehicle and at least partially in contact with the ground surface in the fully deployed configuration.

In some embodiments, the techniques described herein relate to an outrigger assembly, wherein the first extension actuator is configured to transition the first leg assembly between the stowed configuration and a short jack configuration, wherein the first leg assembly is within the maximum width of the utility vehicle and at least partially in contact with the ground surface in the short jack configuration, wherein the second extension actuator is configured to transition the second leg assembly between the stowed configuration and the short jack configuration, and wherein the second leg assembly is within the maximum width of the utility vehicle and at least partially in contact with the ground surface in the short jack configuration.

In some embodiments, the techniques described herein relate to an outrigger assembly, wherein the first leg assembly and the second leg assembly are independently controlled such that the first leg assembly and the second leg assembly transition between configurations independently.

In some embodiments, the techniques described herein relate to an outrigger assembly, further including: a plurality of mount locations disposed on a portion of the outrigger assembly, each with a corresponding effective height of the outrigger assembly.

In some embodiments, the techniques described herein relate to an outrigger assembly, wherein decreasing an effective height of the outrigger assembly increases a penetration depth of the outrigger assembly and decreases a working width of the outrigger assembly, wherein the penetration depth is a distance between ground level and a level of the first leg assembly and the second leg assembly when fully extended, wherein the working width is a width between a first foot of the first leg assembly in the fully deployed configuration and a second foot of the second leg assembly in the fully deployed configuration, and wherein increasing the effective height of the outrigger assembly decreases the penetration depth and increases the working width.

In some embodiments, the techniques described herein relate to an outrigger assembly, wherein the first tilt actuator includes a first hydraulic tilt cylinder operatively coupled to the utility vehicle and the first upper portion of the first leg assembly, wherein the second tilt actuator includes a second hydraulic tilt cylinder operatively coupled to the utility vehicle and the second upper portion of the second leg assembly, wherein the first extension actuator includes a first hydraulic extension cylinder operatively attached to the first upper portion of the first leg assembly and the first lower portion of the first leg assembly, and wherein the second extension actuator includes a second hydraulic extension cylinder operatively attached to the second upper portion of the second leg assembly and the second lower portion of the second leg assembly.

In some embodiments, the techniques described herein relate to an outrigger assembly, wherein the first tilt actuator includes a first motorized pivot operatively coupled to the utility vehicle and the first upper portion of the first leg assembly, wherein the second tilt actuator includes a second motorized pivot operatively coupled to the utility vehicle and the second upper portion of the second leg assembly, wherein the first extension actuator includes a first hydraulic extension cylinder operatively attached to the first upper portion of the first leg assembly and the first lower portion of the first leg assembly, and wherein the second extension actuator includes a second hydraulic extension cylinder operatively attached to the second upper portion of the second leg assembly and the second lower portion of the second leg assembly.

In some embodiments, the techniques described herein relate to a system including: a utility vehicle including a chassis, a plurality of wheels, and a cabin; and one or more outrigger assemblies including: a middle portion; a first side including: a first leg assembly including a first upper portion and a first lower portion; a first tilt actuator operatively connected to the middle portion and the first upper portion of the first leg assembly; and a first extension actuator operatively connected to the first upper portion and the first lower portion; and a second side including: a second leg assembly including a second upper portion and a second lower portion; a second tilt actuator operatively connected to the middle portion and the second upper portion of the second leg assembly; and a second extension actuator operatively connected to the second upper portion and the second lower portion, wherein the first leg assembly and the second leg assembly are configured to transition between a stowed configuration and a fully deployed configuration by actuating the first tilt actuator, the second tilt actuator, the first extension actuator, and the second extension actuator, wherein the first leg assembly and the second leg assembly are configured to transition between the stowed configuration and a short jack configuration by actuating the first extension actuator and the second extension actuator, wherein the middle portion is removably attached to the chassis of the utility vehicle.

In some embodiments, the techniques described herein relate to a system, further including: a control panel including one or more controls configured to operate the one or more outrigger assemblies, the one or more controls including at least one of a button, a switch, a lever, a knob, a user interface, or combinations thereof.

In some embodiments, the techniques described herein relate to a system, wherein the control panel is disposed within the cabin of the utility vehicle.

In some embodiments, the techniques described herein relate to a system, wherein the control panel include a first set of controls configured to operate the first side of the one or more outrigger assemblies and a second set of controls configured to operate the second side of the one or more outrigger assemblies.

In some embodiments, the techniques described herein relate to a system, wherein the first leg assembly and the second leg assembly of the one or more outrigger assemblies are configured to operate independently such that the utility vehicle is made level on a slope of up to 10 degrees.

In some embodiments, the techniques described herein relate to a system, wherein the one or more outrigger assemblies have a penetration depth of up to 30 inches, and wherein the penetration depth is a distance between ground level and a level of the first leg assembly and the second leg assembly when fully extended.

In some embodiments, the techniques described herein relate to a system, wherein a width between a first foot of the first leg assembly in the fully deployed configuration and a second foot of the second leg assembly in the fully deployed configuration is up to 300 inches.

In some embodiments, the techniques described herein relate to an outrigger assembly configured to be removably attached to a utility vehicle, the outrigger assembly including: a middle portion; a first side including: a first leg assembly including a first upper portion and a first lower portion; a first tilt actuator operatively attached to the middle portion and the first upper portion, wherein actuating the first tilt actuator rotates the first leg assembly with respect to a first pivot point on the first side of the middle portion; and a first extension actuator operatively attached to the first upper portion and the first lower portion, wherein actuating the first extension actuator extends the first leg assembly through linear movement of the first lower portion with respect to the first upper portion; and a second side including: a second leg assembly including a second upper portion and a second lower portion; a second tilt actuator operatively attached to the middle portion and the second upper portion, wherein actuating the second tilt actuator rotates the second leg assembly with respect to a second pivot point on the second side of the middle portion; and a second extension actuator operatively attached to the second upper portion and the second lower portion, wherein actuating the second extension actuator extends the second leg assembly through linear movement of the second lower portion with respect to the second upper portion, wherein the second side is opposite the first side.

In some embodiments, the techniques described herein relate to an outrigger assembly, wherein the outrigger assembly is transitioned from a stowed configuration to an out configuration by actuating the first tilt actuator and the second tilt actuator, wherein the outrigger assembly is within a maximum width and a maximum height of the utility vehicle when in the stowed configuration, and wherein the outrigger assembly is not within the maximum width of the utility vehicle when in the out configuration.

In some embodiments, the techniques described herein relate to an outrigger assembly, wherein the outrigger assembly is transitioned from the out configuration to a fully deployed configuration by actuating the first extension actuator and the second extension actuator, and wherein the outrigger assembly is not within the maximum width and the maximum height of the utility vehicle and is in contact with a ground surface when in the fully deployed configuration.

In some embodiments, the techniques described herein relate to an outrigger assembly, wherein the outrigger assembly is configured to transition between a plurality of configurations between the stowed configuration and the fully deployed configuration.

In some embodiments, the techniques described herein relate to an outrigger assembly, wherein the outrigger assembly is transitioned from a stowed configuration to a short jack configuration by actuating the first extension actuator and the second extension actuator, wherein the outrigger assembly is within a maximum height of the utility vehicle when in the stowed configuration, and wherein the outrigger assembly is in contact with ground level when in the short jack configuration.

In some embodiments, the techniques described herein relate to an outrigger assembly, further including: a first plurality of mount locations, each configured to be removably attached to the first upper portion of the first leg assembly and act as the first pivot point; and a second plurality of mount locations, each configured to be removably attached to the second upper portion of the second leg assembly and act as the second pivot point.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWINGS

Embodiments of the present disclosure are described in detail below with reference to the attached drawing figures, wherein:

FIGS. 9A-9C depict an exemplary second side of an outrigger; and

Figure 1:
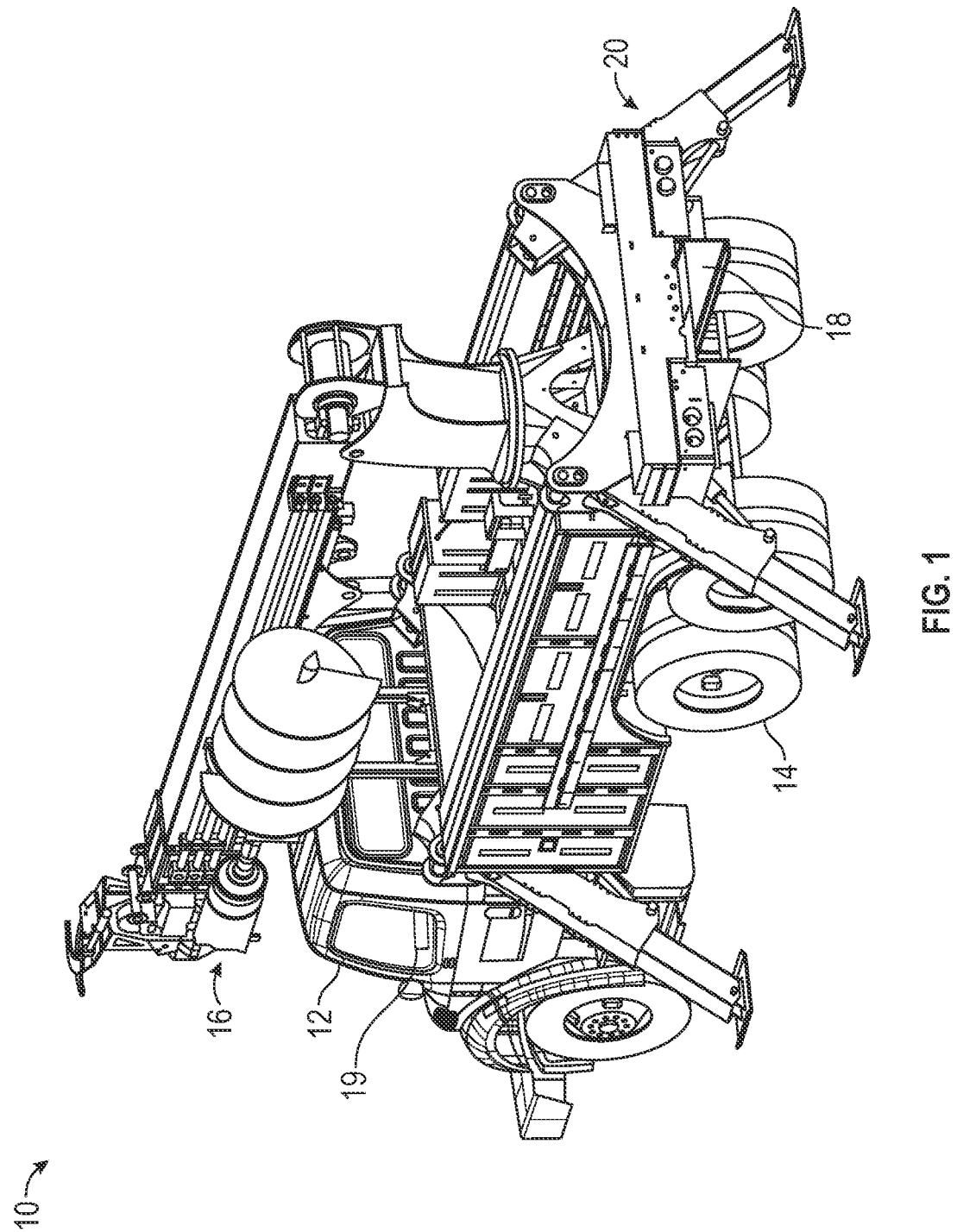
FIG. 1 depicts an exemplary utility vehicle.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description of embodiments of the present disclosure references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. Therefore, the following detailed description is not to be taken in a limiting sense. The scope of embodiments of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

There exists a need for an outrigger design that is simple to operate, does not cause obstruction during or after setup, can stow within the maximum width and maximum height of the utility vehicle, provides user flexibility for setup, and provides stability to the utility vehicle through increased ground penetration and/or wider spread. A compact outrigger device (also referred to herein as an outrigger assembly) provides an increased penetration depth and user flexibility while retaining the ability to stow away within the maximum width and maximum height of the utility vehicle, as discussed below. In some embodiments, a compact outrigger device comprises a first leg, a second leg, and one or more actuators. In some embodiments, one or more actuators control the rotation and extension of the legs of the compact outrigger device with respect to a utility vehicle such that the one or more actuators facilitate the increased penetration depth of the compact outrigger device. The legs of the compact outrigger device may be folded up within the maximum width and maximum height of the utility vehicle or deployed to contact the ground and provide stability to the utility vehicle.

FIG. 1 depicts an exemplary utility vehicle 10. In some embodiments, the utility vehicle 10 may comprise cabin 12, wheels 14, digger assembly 16, chassis 18, and outrigger assembly 20. Embodiments are contemplated in which utility vehicle 10 may be any type of utility vehicle, including utility vehicles without a digger assembly 16. For example, utility vehicle 10 may comprise a boom with a utility platform instead of digger assembly 16. Utility vehicle 10 may comprise one or more outrigger assemblies 20. For example, as depicted in FIG. 1, a plurality of outrigger assemblies 20 may be attached to the chassis 18 of utility vehicle 10. In some embodiments, outrigger assembly 20 may be removably attached to utility vehicle 10. Further, in some embodiments, outrigger assembly 20 may be removably attached to chassis 18 of utility vehicle 10.

In some embodiments, cabin 12 houses the controls to control outrigger assembly 20. Cabin 12 may comprise control panel 19 comprising any combination of buttons, switches, levers, knobs, and user interfaces, as well as any other suitable control device and constituents thereof. For example, cabin 12 may comprise control panel 19 comprising a plurality of switches and a plurality of buttons. Embodiments are contemplated in which control panel 19 to control outrigger assembly 20 are housed outside of cabin 12. For example, control panel 19 may be on an outside surface of utility vehicle 10. Alternatively, or additionally, control panel 19 may be included separately such as within a wired or wireless controller communicatively coupled to at least a portion of the utility vehicle 10.

Figure 2A:
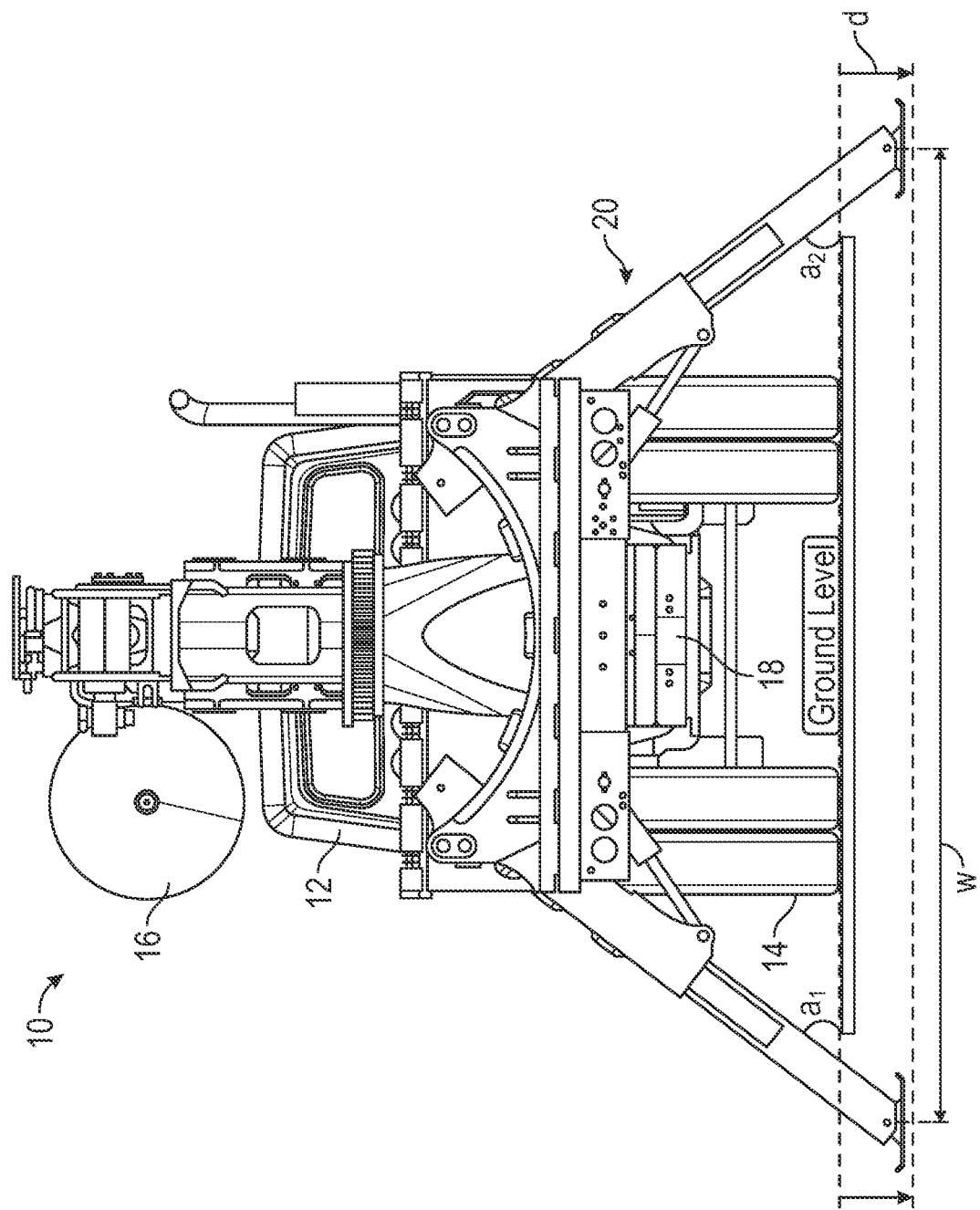
FIG. 2A depicts a back view of an exemplary utility vehicle.

FIG. 2A depicts a back view of an exemplary utility vehicle 10. In some embodiments, outrigger assembly 20 may extend a depth d further than the ground level. Further, in some embodiments, depth d may be up to 15 inches, up to 30 inches, or even beyond 30 inches. In some embodiments, depth d may indicate the distance that outrigger assembly 20 penetrates the ground for increased stability (i.e., the ground penetration depth). Embodiments are contemplated in which outrigger assembly 20 comprises a first leg and a second leg (e.g., first leg assembly 22A and second leg assembly 22B depicted in FIGS. 4-6), wherein the first leg and the second leg may penetrate differing depths. For example, outrigger assembly 20 comprises a first leg with depth d of 8 inches and a second leg with depth d of 13 inches. Further, for example, utility vehicle 10 may be located near a ditch such that the ground level beneath the first leg and the second leg is inconsistent.

In some embodiments, the distance between the pins of the feet of outrigger assembly 20 may be a width w apart. Further, in some embodiments, width w may be up to 200 inches, up to 300 inches, or even beyond 300 inches. For example, the width w between the pins of the feet of outrigger assembly 20 may be 164 inches. In some embodiments, outrigger assembly 20 has a first leg (e.g., first leg assembly 22A depicted in FIGS. 4-6) at an angle $a_1$ with the ground level and a second leg (e.g., second leg assembly 22B depicted in FIGS. 4-6) at an angle $a_2$ with the ground level. Further, in some embodiments, angle $a_1$ and angle $a_2$ may be within the range of 15 degrees to 90 degrees. Embodiments are contemplated in which angle $a_1$ and angle $a_2$ are at different values when outrigger assembly 20 is deployed. For example, angle $a_1$ may be at a value of 90 degrees while angle $a_2$ may be at a value of 45 degrees.

Figure 2B:
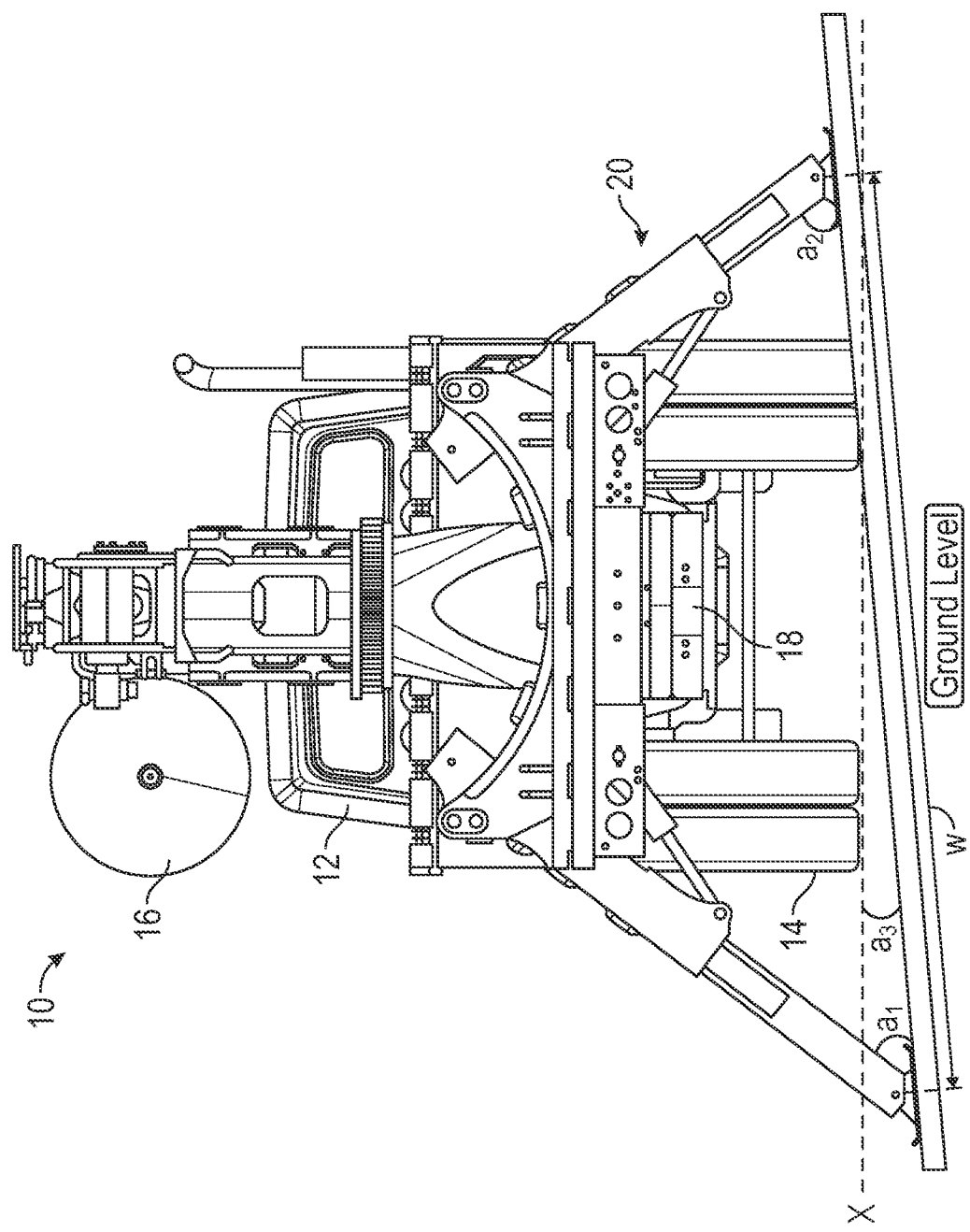
FIG. 2B depicts a back view of an exemplary utility vehicle on a slope.

FIG. 2B depicts a back view of an exemplary utility vehicle 10 on a slope. In some embodiments, deployment of outrigger assembly 20 allows for a bottom of wheels 14 of the utility vehicle 10 to maintain the same general plane even though the utility vehicle is positioned on sloped ground. In FIG. 2B, utility vehicle 10 may be located on a slope such that a bottom of the left and right side wheels 14 of utility vehicle 10 are sitting at the same plane X (i.e., the left and right side wheels are not contacting the ground along the angle of the slope of the ground). In such embodiments, when outrigger assembly 20 is deployed, wheels 14 of utility vehicle 10 may be level, such that an angle $a_3$ is formed between plane X (i.e., the plane through or at a bottom of at least one wheel) and ground level. In some embodiments, the angle $a_3$ may be within the range of 0 degrees to 10 degrees. For example, when utility vehicle 10 is parked on a slope with an incline of 5 degrees, outrigger assembly 20 may be transitioned to a fully deployed configuration such that angle $a_3$ between plane X and the sloped surface is 5 degrees. In some embodiments, angle $a_1$ and angle $a_2$ are at different values due to the angle of the slope. For example, angle $a_1$ may be at a value of 30 degrees and angle $a_2$ may be at a value of 60 degrees. Embodiments are contemplated in which angle $a_1$ and/or angle $a_2$ may be at a value above 90 degrees. For example, angle $a_2$ may be at a value of 100 degrees.

Figure 3:
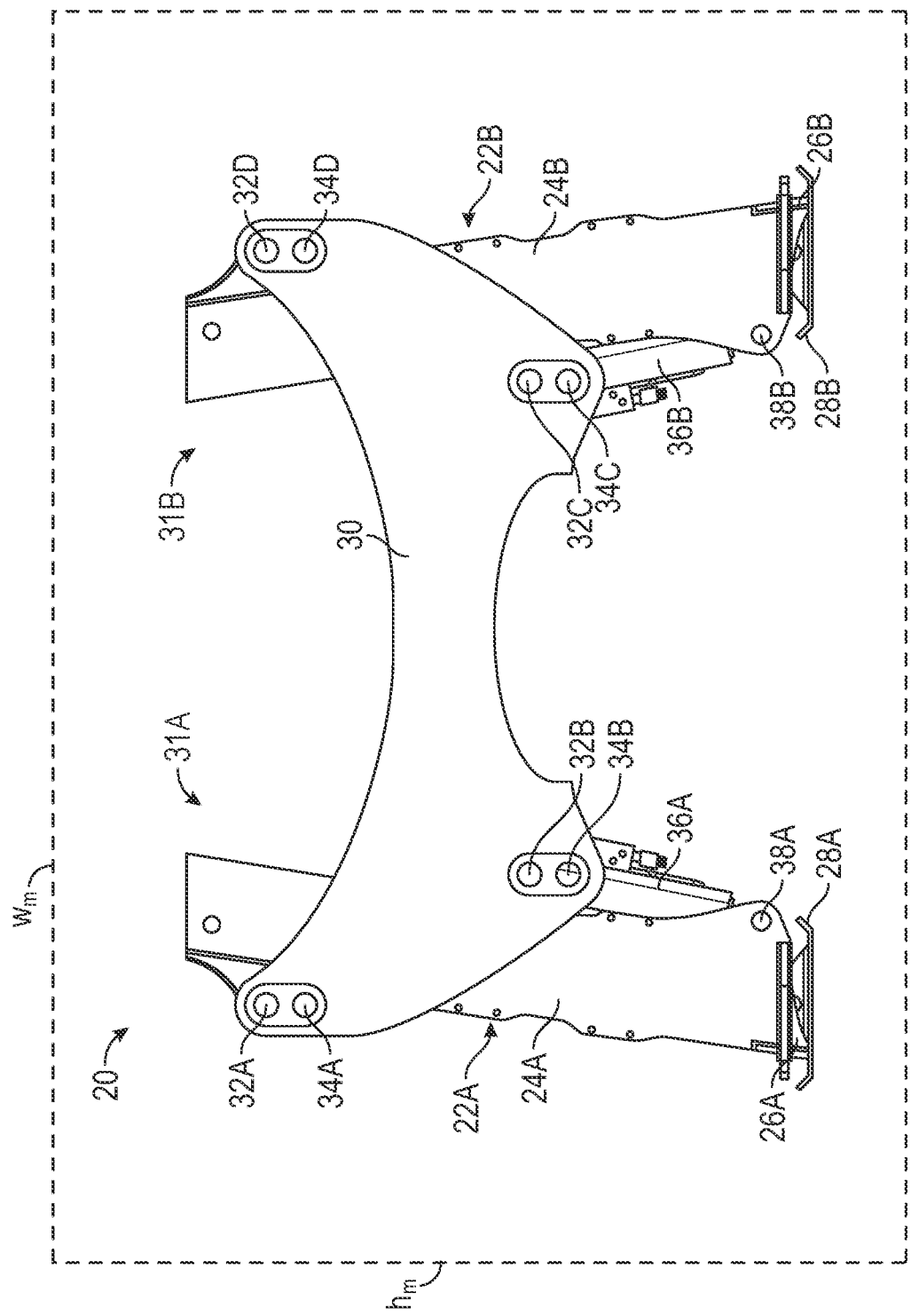
FIG. 3 depicts an exemplary outrigger in a stowed configuration.
Figure 4:
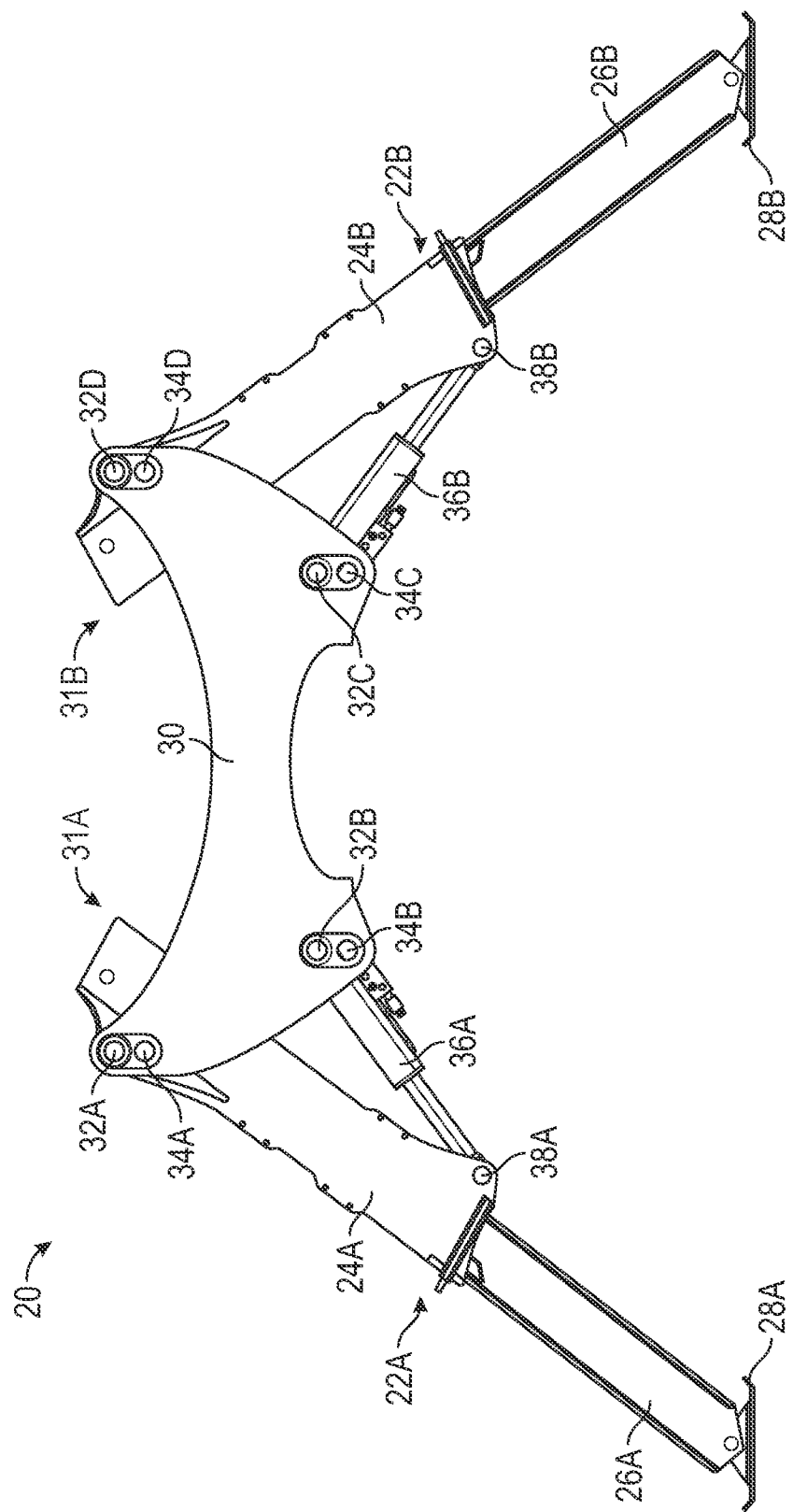
FIG. 4 depicts an exemplary outrigger in a fully deployed configuration.
Figure 5:
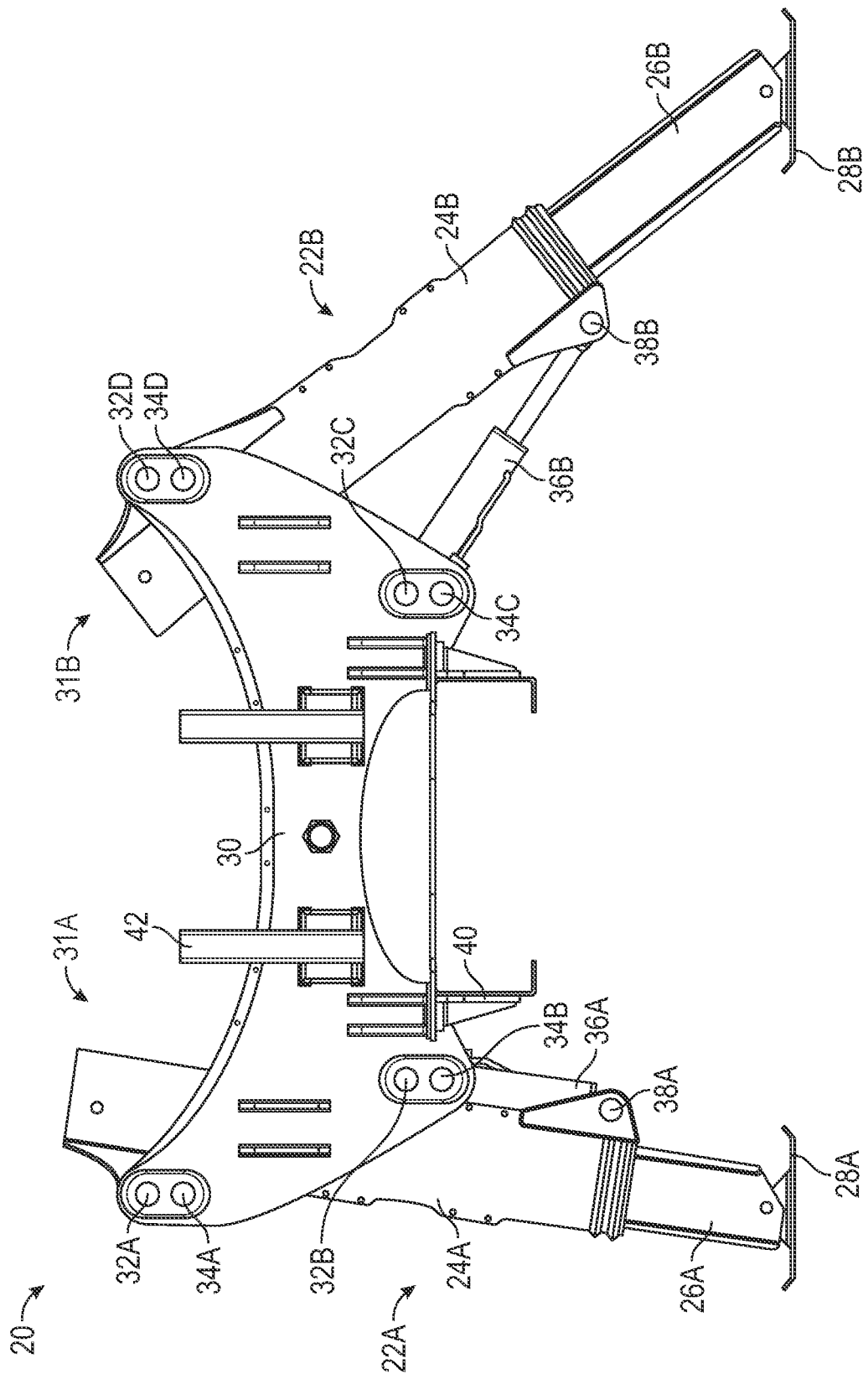
FIG. 5 depicts an exemplary outrigger with a first leg in a short jack configuration and a second leg in a fully deployed configuration.

FIGS. 3-5 depict an exemplary outrigger assembly 20 in a variety of configurations. Specifically, FIG. 3 depicts an exemplary outrigger assembly 20 in a stowed configuration, FIG. 4 depicts an exemplary outrigger assembly 20 in a fully deployed configuration, and FIG. 5 depicts an exemplary outrigger assembly 20 with first leg assembly 22A in a short jack configuration and second leg assembly 22B in a fully deployed configuration. Accordingly, FIGS. 3-5 are discussed together for the following description.

In some embodiments, outrigger assembly 20 presents first and second opposed sides 31A, 31B generally corresponding to first and second sides (e.g., left and right sides) of the utility vehicle when the outrigger assembly 20 is mounted on the utility vehicle. Outrigger assembly 20 may comprise first and second leg assemblies 22A, 22B and a middle portion 30 disposed between and connecting leg assemblies 22A, 22B. Leg assemblies 22A, 22B include respective upper portions 24A, 24B, respective lower portions 26A, 26B, and respective feet 28A, 28B. In some embodiments, first leg assembly 22A may be mounted proximate to the first (e.g., left) side 31A of outrigger assembly 20, and second leg assembly 22B may be mounted proximate to the second (e.g., right) side 31B of outrigger assembly 20.

In embodiments, the outrigger assembly 20 is operable to position the leg assemblies 22A, 22B in a plurality of configurations dependent on operating needs, namely a stowed configuration, as depicted in FIG. 3, a fully deployed configuration, as depicted in FIG. 4, and a short jack configuration, as depicted in FIG. 5. The positioning of the leg assemblies 22A, 22B is performed via a plurality of actuators, discussed below. As shown in FIG. 2A, utility vehicle 10 comprises a frame including chassis 18, plurality of wheels 14 mounted on chassis 18, cabin 12 mounted on chassis 18, and a bed positioned rearward of the cabin 12 and mounted on chassis 18. In embodiments, leg assemblies 22A, 22B of outrigger assembly 20 are positioned relative to the frame of the utility vehicle 10. The frame includes a maximum width $w_m$ from the left and right sides of the frame and maximum height $h_m$ from a top and bottom of the frame (corresponding to the left and right sides of the vehicle and top and bottom of the vehicle). For clarification, the maximum width $w_m$ and maximum height $h_m$ of the frame do not represent physical structures of the utility vehicle or its frame, but rather imaginary distances between corresponding edges of the frame for purposes of describing the stowage of the outrigger assembly relative to the frame.

The above-mentioned maximum distances (e.g., the maximum width $w_m$ and maximum height $h_m$) may be the distance between end most portions of the frame for corresponding sides. For example, the maximum width $w_m$ may be the distance between the leftmost structural portion of the frame and the rightmost structural portion of the frame, and the maximum height $h_m$ may be the distance between the topmost structural portion of the frame and the bottommost structural portion of the frame. In embodiments of the invention, when the outrigger assembly 20 is in the stowed configuration of FIG. 3, no portion of a leg assembly extends beyond the maximum width $w_m$ and maximum height $h_m$ of the frame. Alternatively, in some embodiments, no portion of a leg assembly extends more than five inches, more than 10 inches, or more than 15 inches beyond the maximum width $W_m$ and maximum height $h_m$. Yet further, in embodiments, no portion of a leg assembly extends beyond 5%, beyond 10%, or beyond 15% of the maximum width $w_m$ and maximum height $h_m$ of the frame.

Outrigger assembly 20 may extend beyond the maximum width $w_m$ and/or maximum height $h_m$ of the frame in one or more configurations (e.g., the fully deployed configuration as depicted in FIG. 4 and/or the short jack configuration as depicted in FIG. 5). In embodiments of the invention when outrigger assembly 20 is in the fully deployed configuration of FIG. 4, a portion of a leg assembly may extend beyond the maximum width $w_m$ and the maximum height $h_m$ of the frame. For example, leg assemblies 22A, 22B may extend beyond the maximum height $h_m$ and into the ground beyond the bottom of utility vehicle 10 (i.e., where the tires contact the ground) and beyond the maximum width $W_m$ to facilitate stabilization of utility vehicle 10. In embodiments with outrigger assembly 20 in the fully deployed configuration, the angle between one or both leg assemblies 22A, 22B and the ground level may be within a range of 15 to 75 degrees or within a range of 30 to 60 degrees. For example, in embodiments with leg assemblies 22A, 22B in the fully deployed configuration, angle $a_1$ and angle $a_2$ may be at a value of 45 degrees. For clarification, the fully deployed configuration refers to a configuration in which leg assemblies 22A, 22B are fully rotated and extended to contact the ground. Other configurations may be referred to as "deployed" (e.g., the short jack configuration, discussed below) but are not "fully deployed" as leg assemblies 22A, 22B are not fully rotated in such configurations.

In some embodiments, when outrigger assembly 20 is in the short jack configuration of FIG. 5, a portion of a leg assembly may extend beyond the maximum height $h_m$ of the frame, but no portion of a leg assembly may extend beyond the maximum width $w_m$ of the frame. For example, leg assemblies 22A, 22B may extend beyond the maximum height $h_m$ and into the ground beyond the bottom of utility vehicle 10 but not beyond the maximum width $w_m$ of the frame. Alternatively, in some embodiments, no portion of a leg assembly extends more than five inches, more than 10 inches, or more than 15 inches beyond the maximum width $w_m$. Yet further, in embodiments, no portion of a leg assembly extends beyond 5%, beyond 10%, or beyond 15% of the maximum width $w_m$ of the frame. In embodiments with one or both leg assemblies 22A, 22B in the short jack configuration, the angle between one or both leg assemblies 22A, 22B and the ground level may be within a range of 75 to 90 degrees. For example, in embodiments with first leg assembly 22A in a short jack configuration, angle $a_1$ may be at a value of 85 degrees.

Figure 7:
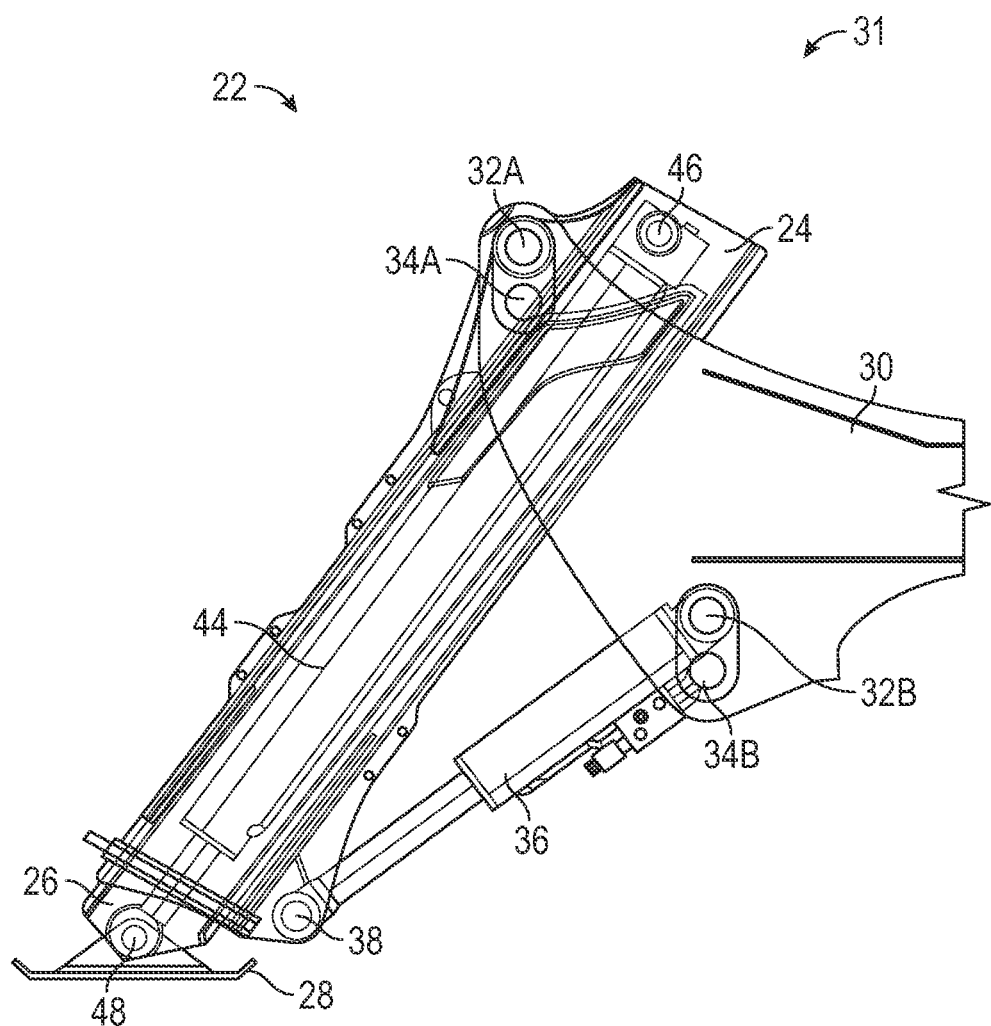
FIG. 7 depicts a transparent view of an exemplary first side of an outrigger with a first leg in an out configuration.

In embodiments, outrigger assembly 20 may be operable to position leg assemblies 22A, 22B in a plurality of configurations between any of the above-discussed configurations. For example, an out configuration (e.g., the out configuration as depicted in FIG. 7) may be a transitional configuration between the stowed configuration and the fully deployed configuration. In embodiments of the invention, when outrigger assembly 20 is in the out configuration, a portion of a leg assembly may extend beyond the maximum width $w_m$ of the frame, but no portion of a leg assembly may extend beyond the maximum height $h_m$ of the frame.

In some embodiments, first leg assembly 22A and second leg assembly 22B may be positioned independently of each other. Further, outrigger assembly 20 may operably position first leg assembly 22A and second leg assembly 22B in any combination of the above-mentioned configurations simultaneously. For example, as depicted in FIG. 5, first leg assembly 22A may be in a short jack configuration, and second leg assembly 22B may be in a fully deployed configuration. Independently operating each leg assembly may be utilized in scenarios that require a minimized working width on one or both sides of utility vehicle 10. For example, while working on a highway, a first leg assembly 22A may be transitioned to a short jack configuration such that the first leg assembly 22A provides stability and support to utility vehicle 10 without taking up excessive space on the highway.

In some embodiments, outrigger assembly 20 comprises one or more actuators to transition between the above-discussed configurations. Leg assemblies 22A, 22B may comprise respective tilt actuators 36A, 36B and respective extension actuators (e.g., an extension actuator 44 disposed on first side 31A and an extension actuator 44 disposed on second side 31B, as discussed below). Tilt actuators 36A, 36B may facilitate rotation of leg assemblies 22A, 22B with respect to a pivot point disposed on middle portion 30. For example, tilt actuators 36A, 36B may facilitate the movement of leg assemblies 22A, 22B between the stowed configuration and the out configuration. The extension actuators (e.g., extension actuator 44) may facilitate the extension of lower portions 26A, 26B of leg assemblies 22A, 22B with respect to upper portions 24A, 24B of leg assemblies 22A, 22B. For example, the extension actuators may facilitate the movement of leg assemblies 22A, 22B between the out configuration and the deployed configuration. In another example, the extension actuators may facilitate the movement of leg assemblies 22A, 22B between the stowed configuration and the short jack configuration. Tilt actuators 36A, 36B and the extension actuators may be actuated sequentially or concurrently.

Leg assemblies 22A, 22B may be removably coupled to the middle portion 30 at one or more mounting locations disposed on the middle portion 30. In some embodiments, the middle portion 30 may comprise upper mount locations 32A, 32B, 32C, 32D and lower mount locations 34A, 34B, 34C, 34D such that leg assemblies 22A, 22B may be removably attached at various heights, as discussed below. In some embodiments, first leg assembly 22A may be mounted on a first (e.g., left) side of middle portion 30, and second leg assembly 22B may be mounted on a second (e.g., right) side of middle portion 30. In embodiments, the first and second sides of the middle portion 30 may comprise one or more mounting locations. For example, as depicted in FIGS. 3-5, upper mount locations 32A, 32B and lower mount locations 34A, 34B may be disposed on the first side of the middle portion 30, and upper mount locations 32C, 32D and lower mount locations 34C, 34D may be disposed on the first side of the middle portion 30.

In some embodiments, leg assemblies 22A, 22B are removably coupled at a plurality of locations to facilitate the rotational movement of leg assemblies 22A, 22B. For example, upper portions 24A, 24B may be removably coupled to upper mount locations 32A, 32D or lower mount locations 34A, 34D such that the upper portions are fixed to middle portion 30 at a selectable height. Further, tilt actuators 36A, 36B may be removably coupled to upper mount locations 32B, 32C or lower mount locations 34B, 34C and tilt actuator mounts 38A, 38B disposed on upper portions 24A, 24B such that the upper portions are fixed to middle portion 30 at a selectable height via tilt actuators 36A, 36B. The above-discussed connections may be utilized to facilitate the movement of leg assemblies 22A, 22B with tilt actuators 36A, 36B. Various configurations of actuators and connections are contemplated and discussed below in FIGS. 9A-9C.

The plurality of mounting locations may allow utility vehicles with varying chassis heights to utilize outrigger assembly 20. The plurality of mount locations may be used to change an effective height of outrigger assembly 20, the effective height being the distance between the ground level and feet 28A, 28B while outrigger assembly 20 is in the stowed configuration. For example, the effective height while leg assemblies 22A, 22B are coupled at upper mount locations 32A, 32B, 32C, 32D is greater than the effective height while leg assemblies 22A, 22B are attached at lower mount locations 34A, 34B, 34C, 34D. The ground penetration and working width of outrigger assembly 20 may depend at least in part on the effective height of outrigger assembly 20 and/or the height of chassis 18.

In some embodiments, transitioning from a higher mount location to a lower mount location increases ground penetration provided by outrigger assembly 20 and decreases the working width of outrigger assembly 20 in the fully deployed configuration. For example, for a chassis height of 45 inches, transitioning from upper mount locations 32A, 32B, 32C, 32D to lower mount locations 34A, 34B, 34C, 34D increases the ground penetration from 7 inches to 11 inches. Conversely, in some embodiments, transitioning from a lower mount location to a higher mount location decreases ground penetration provided by outrigger assembly 20 and increases the working width of outrigger assembly 20 in the fully deployed configuration. For example, for a chassis height of 44 inches, transitioning from lower mount locations 34A, 34B, 34C, 34D to upper mount locations 32A, 32B, 32C, 32D decreases the ground penetration from 12 inches to 8 inches.

In some embodiments, upper mount locations 32A, 32B, 32C, 32D are utilized for chassis heights of 47 inches or below. In some embodiments, lower mount locations 34A, 34B, 34C, 34D are utilized for chassis heights of 45 inches or higher. In some embodiments, the mount locations may be adjusted to accommodate any height of chassis. Embodiments are contemplated in which outrigger assembly 20 comprises more than two mount locations such that utility vehicles with a wider range of chassis heights may utilize outrigger assembly 20. Embodiments are contemplated in which one or more mount locations are configured to mount leg assemblies 22A, 22B in a plurality of locations. For example, one or more mount locations may comprise oval-shaped holes or slots that allow connectors (e.g., bolts) to slide within, such that when the connectors are tightened, leg assemblies 22A, 22B are held in one of the plurality of locations.

Embodiments are contemplated in which outrigger assembly 20 comprises a plurality of middle portions (e.g., middle portion 30). In some embodiments, outrigger assembly 20 comprises a first middle portion and a second middle portion. Further, first leg assembly 22A may be removably attached to the first middle portion and second leg assembly 22B may be removably attached to the second middle portion. In some embodiments, the first middle portion and/or the second middle portion comprises a plurality of mount locations (e.g., upper mount locations 32A, 32B, 32C, 32D and lower mount locations 34A, 34B, 34C, 34D). Leg assemblies 22A, 22B may be removably attached to the plurality of middle portions in a plurality of locations and/or a plurality of configurations. In some embodiments, movement of leg assemblies 22A, 22B may be with respect to a corresponding middle portion removably attached to leg assemblies 22A, 22B. For example, first leg assembly 22A removably attached to a first middle portion may rotate away from the first middle portion when first tilt actuator 36A is actuated.

Embodiments are contemplated in which outrigger assembly 20 does not comprise middle portion 30. In such embodiments, leg assemblies 22A, 22B are removably attached to utility vehicle 10. Further, utility vehicle 10 may comprise a plurality of mount locations (e.g., upper mount locations 32A, 32B, 32C, 32D and lower mount locations 34A, 34B, 34C, 34D) such that leg assemblies 22A, 22B may be removably attached to any of the plurality of mount locations. In such embodiments, movement of leg assemblies 22A, 22B may be with respect to utility vehicle 10. For example, actuating tilt actuators 36A, 36B rotates leg assemblies 22A, 22B away from utility vehicle 10. In some embodiments, outrigger assembly 20 is removably attached to chassis 18 of utility vehicle 10. In such embodiments, chassis 18 may comprise a plurality of mount locations (e.g., upper mount locations 32A, 32B, 32C, 32D and lower mount locations 34A, 34B, 34C, 34D) such that leg assemblies 22A, 22B may be removably attached to any of the plurality of mount locations.

In some embodiments, outrigger assembly 20 comprises attachment portion 40, depicted in FIG. 5. In such embodiments, attachment portion 40 may facilitate the attachment of outrigger assembly 20 to utility vehicle 10. For example, outrigger assembly 20 may be removably attached to the chassis 18 of utility vehicle 10 via attachment portion 40. In some embodiments, outrigger assembly 20 comprises one or more support members 42, depicted in FIG. 5. In such embodiments, the one or more support members 42 may be coupled to a digger assembly support configured to hold at least a portion of the digger assembly 16 of utility vehicle 10 such that the movement of digger assembly 16 is restricted when resting on the digger assembly support coupled to the one or more support members 42. Embodiments are contemplated in which one or more support members 42 may be configured to hold other equipment included on or associated with utility vehicle 10. For example, the boom of a boom truck may be stowed and held by the one or more support members 42.

Figure 6:
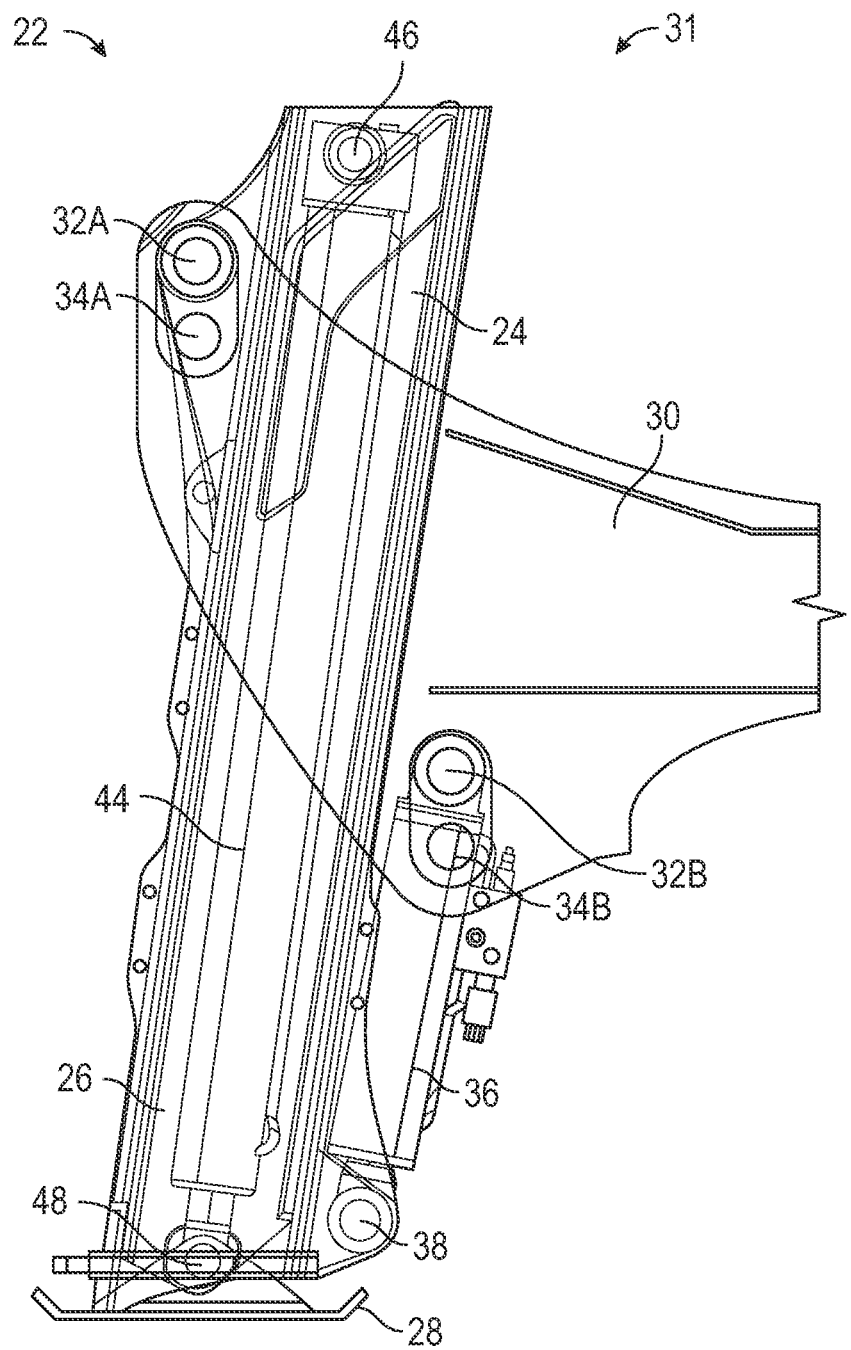
FIG. 6 depicts a transparent view of an exemplary first side of an outrigger with a first leg in a stowed configuration.
Figure 8:
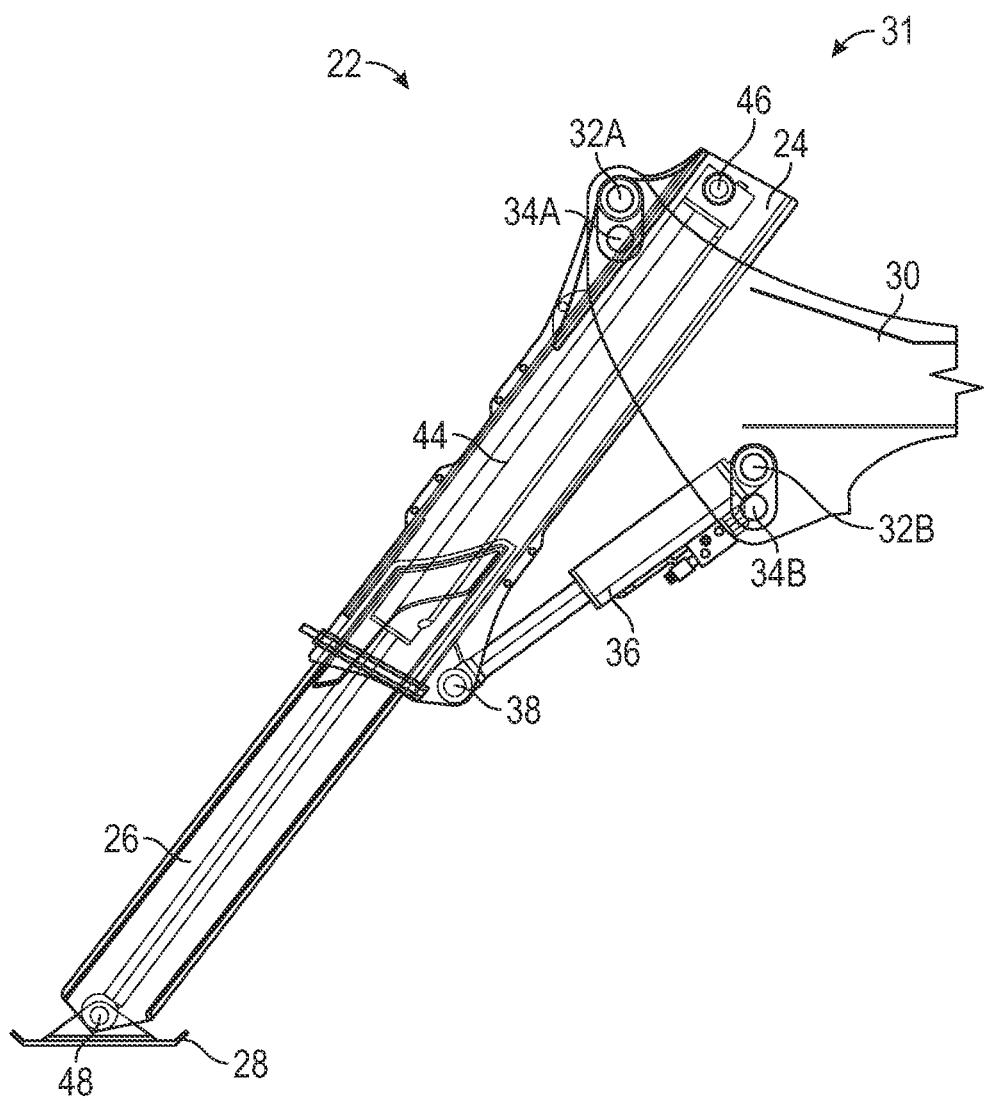
FIG. 8 depicts a transparent view of an exemplary first side of an outrigger with a first leg in a fully deployed configuration.

FIGS. 6-8 depict a transparent view of an exemplary side 31 with leg assembly 22 in a variety of configurations. Specifically, FIG. 6 depicts a transparent view of an exemplary side 31 with leg assembly 22 in a stowed configuration, FIG. 7 depicts a transparent view of an exemplary side 31 with leg assembly 22 in an out configuration, and FIG. 8 depicts a transparent view of an exemplary side 31 with leg assembly 22 in a fully deployed configuration. Accordingly, FIGS. 6-8 are discussed together for the following description.

Even though FIGS. 6-8 show side 31, it should be understood that references to side 31 in FIGS. 6-8 may apply to first side 31A and/or second side 31B. Further, any reference numeral introduced in FIGS. 6-8 may have a counterpart comprised by first side 31A and/or second side 31B. For example, tilt actuator 36 comprised by side 31 may have a counterpart tilt actuator 36A comprised by first side 31A and a counterpart tilt actuator 36B comprised by second side 31B.

In some embodiments, leg assembly 22 comprises upper portion 24, lower portion 26, foot 28, tilt actuator 36, and extension actuator 44. In some embodiments, tilt actuator 36 is operatively connected to middle portion 30 of outrigger assembly 20 and upper portion 24 of leg assembly 22. In some embodiments, tilt actuator 36 may be removably attached to upper mount location 32B of middle portion 30 and to tilt actuator mount 38 of upper portion 24 of leg assembly 22 such that tilt actuator 36 facilitates movement of leg assembly 22 with respect to the middle portion 30. Alternatively, in some embodiments, tilt actuator 36 may be removably attached to lower mount location 34B of middle portion 30 and to tilt actuator mount 38 of upper portion 24 of leg assembly 22.

In some embodiments, upper portion 24 of leg assembly 22 are removably attached to upper mount location 32A or lower mount location 34A that act as a pivot for the movement facilitated by tilt actuator 36 such that when tilt actuator 36 is actuated, leg assembly 22 is transitioned between the stowed configuration and an out configuration as discussed above. Embodiments are contemplated in which tilt actuator 36 may comprise any combination of hydraulic cylinders, pneumatic cylinders, rack and pinion, electric motors, stepper motors, and jackscrews, as well as any other suitable actuators and constituents thereof (discussed later in FIGS. 9A-9C).

In some embodiments, extension actuator 44 is operatively connected to upper portion 24 of leg assembly 22 and to lower portion 26 of leg assembly 22. In some embodiments, extension actuator 44 may be removably attached to top extension actuator mount 46 of the upper portion 24 of leg assembly 22 and to bottom extension actuator mount 48 of lower portion 26 of leg assembly 22 such that extension actuator 44 facilitates movement of lower portion 26 of leg assembly 22 with respect to the upper portion 24 of leg assembly 22. In some embodiments, the movement facilitated by extension actuator 44 is linear such that when extension actuator 44 is actuated, leg assembly 22 is transitioned between the out configuration and the fully deployed configuration as discussed above. Further, in some embodiments, the movement facilitated by extension actuator 44 is linear such that when extension actuator 44 is actuated, leg assembly 22 is transitioned between the stowed configuration and the short jack configuration as discussed above.

Embodiments are contemplated in which bottom extension actuator mount 48 may be removably coupled to foot 28. In some embodiments, foot 28 is configured to disperse the forces provided by extension actuator 44 to the ground, such that outrigger assembly 20 may provide stability to utility vehicle 10 without damaging or deforming the ground below utility vehicle 10. In some embodiments, foot 28 may be removably attached to boots (not shown) to further disperse the forces provided by extension actuator 44 and/or provide greater ground penetration to outrigger assembly 20. Embodiments are contemplated in which extension actuator 44 may comprise any combination of hydraulic cylinders, pneumatic cylinders, rack and pinion, electric motors, stepper motors, and jackscrews, as well as any other suitable actuators and constituents thereof (discussed later in FIGS. 9A-9C).

Tilt actuator 36 may be configured to hold any position between an unextended position and an extended position such that a plurality of positions and/or configurations may be held between the extended position and the unextended position. For example, tilt actuator 36 may extend halfway between the unextended position (e.g., the stowed configuration as depicted in FIG. 6) and the extended position (e.g., the out configuration as depicted in FIG. 7). Embodiments are contemplated in which a first tilt actuator (e.g., first tilt actuator 36A) may hold a first position and a second tilt actuator (e.g., second tilt actuator 36B) may hold a second position, wherein the first position is different than the second position. For example, the first position may be the extended position, and the second position may be halfway between the unextended position and the extended position.

Similarly, extension actuator 44 may be configured to hold any position between an unextended position and an extended position such that a plurality of positions and/or configurations may be held between extended position and the unextended position, the out configuration and the fully deployed configuration and a plurality of configurations between the stowed configuration and the short jack configuration. For example, extension actuator 44 may extend halfway between the unextended position (e.g., the stowed configuration or the out configuration) and the extended position (e.g., the short jack configuration or the fully deployed configuration). Embodiments are contemplated in which a first extension actuator comprised by a first side (e.g., first side 31A) may hold a first position and a second extension actuator comprised by a second side (e.g., second side 31B) may hold a second position, wherein the first position is different than the second position.

Figure 9B:
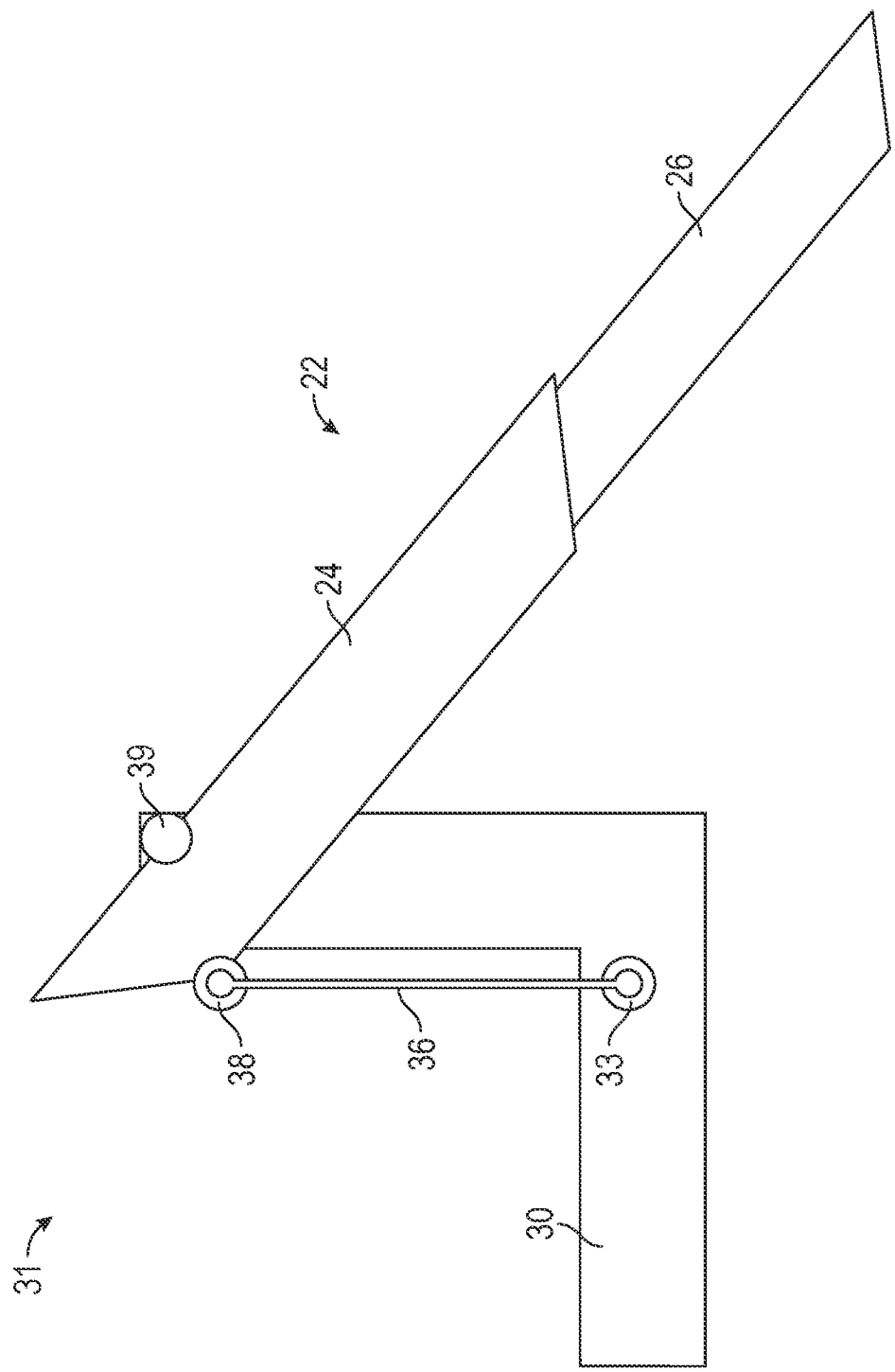

FIGS. 9A-9C depict exemplary embodiments of side 31 comprising leg assembly 22. Even though FIGS. 9A-9C show side 31, it should be understood that references to side 31 in FIGS. 9A-9C may apply to first side 31A and/or second side 31B. Further, any reference numeral introduced in FIGS. 9A-9C may have a counterpart comprised by first side 31A and/or second side 31B. For example, tilt actuator 36 comprised by side 31 may have a counterpart tilt actuator 36A comprised by first side 31A and a counterpart tilt actuator 36B comprised by second side 31B.

FIG. 9A depicts an exemplary side 31 comprising leg assembly 22. FIG. 9A depicts embodiments like those mentioned above. Leg assembly 22 may comprise upper portion 24, lower portion 26, and tilt actuator 36. In some embodiments, tilt actuator 36 may be removably attached to middle portion 30 and upper portion 24 of leg assembly 22. In some embodiments, tilt actuator 36 may be removably attached to middle portion 30 at mount location 33. Further, in some embodiments, mount location 33 may be an upper mount location (e.g., upper mount location 32B or 32C) or a lower mount location (e.g., lower mount location 34B or 34C) of middle portion 30 as discussed above. As depicted in FIG. 9A, tilt actuator 36 may be removably attached to tilt actuator mount 38. In some embodiments, tilt actuator mount 38 may be attached proximate to a bottom side of upper portion 24 of leg assembly 22. When tilt actuator 36 is unextended, leg assembly 22 may be in the stowed configuration. Conversely, when tilt actuator 36 is extended, as depicted in FIG. 9A, leg assembly 22 may pivot with respect to pivot point 39 to facilitate the transition from the stowed configuration to the out configuration or the fully deployed configuration as discussed above. In some embodiments, pivot point 39 may be an upper mount location (e.g., upper mount locations 32A or 32D) or a lower mount location (e.g., lower mount location 34A or 34D) as discussed above. Embodiments are contemplated in which pivot point 39 may be any mount location out of a plurality of mount locations.

FIG. 9B depicts an exemplary side 31 comprising leg assembly 22. In some embodiments, tilt actuator 36 may be attached to middle portion 30 and upper portion 24 of leg assembly 22. In some embodiments, tilt actuator 36 may be removably attached to middle portion 30 at mount location 33. Further, in some embodiments, mount location 33 may be an upper mount location (e.g., upper mount location 32B or 32C) or a lower mount location (e.g., lower mount location 34B or 34C) of the middle portion 30. Further, in some embodiments, tilt actuator 36 may be removably attached to tilt actuator mount 38. As depicted in FIG. 9B, tilt actuator mount 38 may be attached proximate to a top side of the upper portion 24 of leg assembly 22. When tilt actuator 36 is extended, leg assembly 22 may be in the stowed configuration. Conversely, when tilt actuator 36 is unextended, as depicted in FIG. 9B, leg assembly 22 may pivot with respect to pivot point 39 to facilitate the transition from the stowed configuration to the out configuration or the fully deployed configuration as discussed above. In some embodiments, pivot point 39 may be an upper mount location (e.g., upper mount locations 32A or 32D) or a lower mount location (e.g., lower mount location 34A or 34D). Embodiments are contemplated in which pivot point 39 may be any of a plurality of mount locations as discussed above.

FIG. 9C depicts an exemplary side 31 comprising leg assembly 22. In some embodiments, leg assembly 22 comprises motorized pivot 50, tension strap 52, and/or end stop 54. Motorized pivot 50 may be utilized to facilitate the transitioning of leg assembly 22 between configurations. For example, motorized pivot 50 may rotate leg assembly 22 such that leg assembly 22 is transitioned between the stowed configuration and the out configuration. Additionally, or alternatively, motorized pivot 50 may facilitate the transition of leg assembly 22 between the stowed configuration and the fully deployed configuration. Tension strap 52 may be removably attached to middle portion 30 at mount location 33. Further, tension strap 52 may be removably attached to upper portion 24 of leg assembly 22 at leg mount location 53. In some embodiments, tension strap 52 is mounted similarly to tilt actuator 36 as discussed above. For example, tension strap 52 may be removably attached proximate to the bottom side of the upper portion 24 such that tension strap 52 is in tension when leg assembly 22 is in an out configuration. End stop 54 may be utilized to prevent rotation with respect to motorized pivot 50 beyond a certain angle. For example, end stop 54 prevents motorized pivot 50 from rotating beyond a 45-degree angle rotation.

Embodiments are contemplated in which any combination of the above-mentioned embodiments may be utilized in outrigger assembly 20. For example, tension strap 52 may be used with tilt actuator 36 such that a smaller actuator may be utilized due to tension strap 52 holding the tension when outrigger assembly 20 is in the fully deployed configuration. In some embodiments, tilt actuator 36 and/or extension actuator 44 may comprise any combination of hydraulic cylinders, pneumatic cylinders, rack and pinion, electric motors, stepper motors, and jackscrews, as well as any other suitable actuators and constituents thereof.

Figure 10:
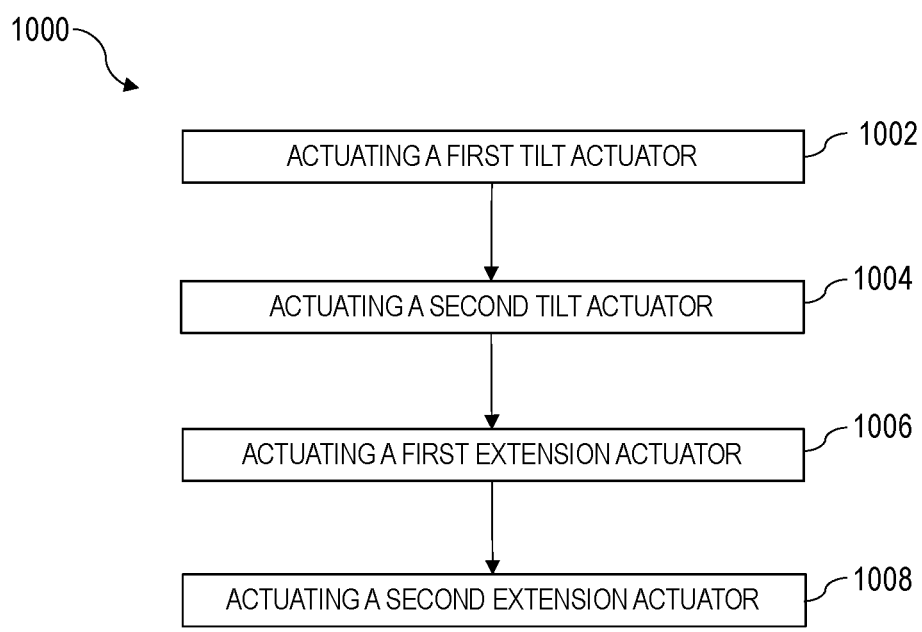
FIG. 10 depicts an exemplary method for deploying an outrigger.

FIG. 10 depicts an exemplary method 1000 for deploying outrigger assembly 20. At step 1002, first tilt actuator 36A is actuated. In some embodiments, actuating first tilt actuator 36A transitions first leg assembly 22A of outrigger assembly 20 from a stowed configuration to an out configuration. In some embodiments, first leg assembly 22A may transition to a plurality of configurations between the stowed configuration and the out configuration. In some embodiments, actuation of the first tilt actuator 36A may be performed by any combination of hydraulic cylinders, pneumatic cylinders, rack and pinion, electric motors, stepper motors, and jackscrews, as well as any other suitable actuators and constituents thereof.

At step 1004, second tilt actuator 36B is actuated. In some embodiments, actuating second tilt actuator 36B transitions second leg assembly 22B of outrigger assembly 20 from a stowed configuration to an out configuration. In some embodiments, second leg assembly 22B may transition to a plurality of configurations between the stowed configuration and the out configuration. In some embodiments, actuation of the second tilt actuator 36B may be performed by any combination of hydraulic cylinders, pneumatic cylinders, rack and pinion, electric motors, stepper motors, and jackscrews, as well as any other suitable actuators and constituents thereof. Embodiments are contemplated in which step 1004 is performed concurrently or sequentially to step 1002. For example, step 1002 and step 1004 may be performed concurrently such that leg assemblies 22A, 22B are transitioned from a stowed configuration to an out configuration.

At step 1006, a first extension actuator (e.g., extension actuator 44 on first side 31A) is actuated. In some embodiments, actuating the first extension actuator transitions first leg assembly 22A of outrigger assembly 20 from the out configuration to a fully deployed configuration. Alternatively, or additionally, actuating the first extension actuator transitions first leg assembly 22A of outrigger assembly 20 from the stowed configuration to a short jack configuration. In some embodiments, first leg assembly 22A may transition to a plurality of configurations between the out configuration and the fully deployed configuration and a plurality of configurations between the stowed configuration and the short jack configuration. In some embodiments, the first extension actuator may be by any combination of hydraulic cylinders, pneumatic cylinders, rack and pinion, electric motors, stepper motors, and jackscrews, as well as any other suitable actuators and constituents thereof.

At step 1008, a second extension actuator (e.g., extension actuator 44 on second side 31B) is actuated. In some embodiments, actuating the second extension actuator transitions second leg assembly 22B of outrigger assembly 20 from the out configuration to a fully deployed configuration. Alternatively, or additionally, actuating the second extension actuator transitions second leg assembly 22B of outrigger assembly 20 from the stowed configuration to a short jack configuration. In some embodiments, second leg assembly 22B may transition to a plurality of configurations between the out configuration and the fully deployed configuration and a plurality of configurations between the stowed configuration and the short jack configuration. In some embodiments, the second extension actuator may be by any combination of hydraulic cylinders, pneumatic cylinders, rack and pinion, electric motors, stepper motors, and jackscrews, as well as any other suitable actuators and constituents thereof. Embodiments are contemplated in which step 1008 is performed concurrently or sequentially to step 1006. For example, step 1006 and step 1008 may be performed concurrently such that leg assemblies 22A, 22B are transitioned from the out configuration to the fully deployed configuration.

Embodiments are contemplated in which step 1002, step 1004, step 1006, and step 1008 may be performed concurrently or sequentially. For example, first tilt actuator 36A, second tilt actuator 36B, the first extension actuator, and the second extension actuator may be actuated concurrently such that leg assemblies 22A, 22B are transitioned from a stowed configuration to a fully deployed configuration. In another example, tilt actuators 36A, 36B may be actuated concurrently such that leg assemblies 22A, 22B are transitioned from a stowed configuration to an out configuration and then extension actuators (e.g., an extension actuator 44 disposed on first side 31A and an extension actuator 44 disposed on second side 31B) may be actuated concurrently such that leg assemblies 22A, 22B are transitioned from the out configuration to a fully deployed configuration.

Embodiments are contemplated in which step 1002 and/or step 1004 may be omitted such that performing step 1006 and step 1008 transitions first leg assembly 22A and/or second leg assembly 22B from a stowed configuration to a short jack configuration. For example, emitting step 1002 allows for first leg assembly 22A to be transitioned from a stowed configuration to a short jack configuration while second leg assembly 22B is transitioned from a stowed configuration to a fully deployed configuration. In another example in which step 1002 and step 1004 are omitted, leg assemblies 22A, 22B are transitioned from a stowed configuration to a short jack configuration by performing step 1006 and step 1008.

Embodiments are contemplated in which first tilt actuator 36A and/or second tilt actuator 36B are configured to transition between a plurality of configurations between the stowed configuration and the out configuration. For example, tilt actuators 36A, 36B may be configured to transition between 20 separate configurations between the stowed configuration and the out configuration. Further, in some embodiments, first tilt actuator 36A and/or second tilt actuator 36B are configured to hold any of the plurality of configurations such that outrigger assembly 20 comprises an adjustable width w when deployed.

Embodiments are contemplated in which the first extension actuator and/or the second extension actuator are configured to transition between a first plurality of configurations between the out configuration and the fully deployed configuration and a second plurality of configurations between the stowed configuration and the short jack configuration. For example, the extension actuators (e.g., an extension actuator 44 disposed on first side 31A and an extension actuator 44 disposed on second side 31B) may be configured to transition between 20 separate configurations between the out configuration and the fully deployed configuration. Further, in some embodiments, the first extension actuator and/or the second extension actuator are configured to hold any of the first plurality of configurations and/or the second plurality of configurations such that outrigger assembly 20 comprises an adjustable depth d (i.e., an adjustable penetration depth) when deployed.

Embodiments are contemplated in which the above-mentioned steps may be reversed to transition leg assemblies 22A, 22B of outrigger assembly 20 between configurations. For example, step 1002 and step 1004 may be reversed such that tilt actuators 36A, 36B are utilized to transition leg assemblies 22A, 22B of outrigger assembly 20 from the out configuration to the stowed configuration. In another example, step 1006 and step 1008 may be reversed such that the extension actuators (e.g., an extension actuator 44 disposed on first side 31A and an extension actuator 44 disposed on second side 31B) are utilized to transition leg assemblies 22A, 22B of outrigger assembly 20 from the fully deployed configuration to the out configuration or from the short jack configuration to the stowed configuration.

Embodiments are contemplated in which method 1000 is performed by instructing a user of outrigger assembly 20 to perform at least a portion of the above-mentioned steps. For example, a user may be instructed to perform step 1002, step 1004, step 1006, and step 1008 such that the user may transition outrigger assembly 20 from a stowed configuration to a fully deployed configuration.

In some embodiments, control panel 19 may be utilized to perform the above-mentioned steps. Control panel 19 may comprise any combination of a button, a switch, a lever, a knob, a user interface, as well as any other suitable control device and constituents thereof. In some embodiments, the above-mentioned steps are performed responsive to any of a manual input from an operator and/or automatically. In some embodiments, any of the above-mentioned steps may be performed responsive to a manual input of a corresponding lever disposed on control panel 19 operated by a user. Further, in some embodiments, the above-mentioned steps may be performed incrementally responsive to a gradual operator input. For example, step 1002 is performed responsive to a manual input of a first tilt actuator lever operated by a user, step 1004 is performed responsive to a manual input of a second tilt actuator lever operated by a user, step 1006 is performed responsive to a manual input of a first extension actuator lever operated by a user, and step 1008 is performed responsive to a manual input of a second extension actuator lever operated by a user. Further, for example, the movement of leg assemblies 22A, 22B may be incrementally such that leg assemblies 22A, 22B may transition between a plurality of configurations.

In some embodiments, any of the above-mentioned steps may be performed automatically in response to a user interacting with the one or more controls disposed on control panel 19. For example, step 1002 is performed automatically in response to a user interacting with a first tilt actuator button, step 1004 is performed automatically in response to a user interacting with a second tilt actuator button, step 1006 is performed automatically in response to a user interacting with a first extension actuator button, and step 1008 is performed automatically in response to a user interacting with a second extension actuator button.

Embodiments are contemplated in which an above-mentioned step may be performed responsive to a plurality of controls disposed on control panel 19. For example, step 1002 may be performed automatically in response to a user interacting with a button such that first leg assembly 22A is transitioned from the stowed configuration to the out configuration and a lever may be utilized to perform step 1002 such that first leg assembly 22A may be transitioned to a plurality of configurations between the stowed configuration and the out configuration.

Embodiments are contemplated in which a plurality of steps may be performed using one or more controls disposed on control panel 19. For example, step 1002 and step 1004 may be performed automatically in response to a user pressing a button. In some embodiments, control panel 19 comprises a plurality of buttons to transition outrigger assembly 20 into a configuration corresponding to each button. For example, control panel 19 may comprise a stowed configuration button to configured transition outrigger assembly 20 into the stowed configuration and a fully deployed button configured to transition outrigger assembly 20 into the fully deployed configuration. Further, control panel 19 may comprise a short jack configuration button configured to transition outrigger assembly 20 into the short jack configuration.

In some embodiments, control panel 19 may comprise a button to trigger an outrigger deployment routine. The outrigger deployment routine may include any of the above-mentioned steps. For example, an outrigger deployment routine may first perform step 1002 and 1004 concurrently and then perform step 1006 and step 1008 concurrently. In some embodiments, control panel 19 may trigger one or more outrigger deployment routines. For example, control panel 19 may comprise a plurality of controls to trigger an outrigger full deployment routine and an outrigger short jack deployment routine.

In some embodiments, outrigger assembly 20 comprises one or more object detection devices. One or more object detection devices may include any combination of a presence sensor, a visual sensor, a capacitance sensor, a proximity sensor, or any other form of suitable object detection means. One or more object detection devices may be utilized to prevent collision with foreign objects while deploying outrigger assembly 20. In some embodiments, one or more object detection devices may prevent collisions with foreign objects by restricting the movement of one or more leg assemblies 22. Further, in some embodiments, while deploying one or more leg assemblies 22, one or more object detection devices may restrict the actuation of one or more tilt actuators 36 and/or one or more extension actuators 44. One or more leg assemblies 22 may be restricted in terms of radial and/or linear movement to prevent collisions with foreign objects. In some embodiments, leg assemblies 22A, 22B comprise one or more object detection devices such that each leg assembly may independently prevent collisions with foreign objects while deploying leg assemblies 22A, 22B. Additionally, or alternatively, one or more object detection devices may be used to detect the position of one or more leg assemblies 22. For example, a proximity sensor may be included that is configured to detect whether the leg assemblies 22A, 22B are in any of the stowed, deployed, short jack, or other configuration. Further, in some embodiments, a proximity sensor or other detection device may be used to determine an extension length or angle of the outrigger leg assemblies. Further still, the one or more detection devices may be utilized to provide feedback to a control system (e.g., control panel 19) to communicate the position of one or more leg assemblies 22 to a user.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

The invention claimed is:

1. An outrigger assembly configured to be removably attached to a utility vehicle, the outrigger assembly comprising:
    a first leg assembly comprising a first upper portion and a first lower portion, the first leg assembly rotatably coupled to the utility vehicle at the first upper portion;
    a first tilt actuator configured to transition the first leg assembly between a stowed configuration and an out configuration,
    wherein the first leg assembly is stowed within a maximum width and a maximum height of the utility vehicle in the stowed configuration,
    wherein the first leg assembly is rotated away from the utility vehicle in the out configuration;
    a first extension actuator configured to transition the first leg assembly between the out configuration and a fully deployed configuration,
    wherein the first leg assembly is rotated away from the utility vehicle and at least partially in contact with a ground surface in the fully deployed configuration;
    a second leg assembly comprising a second upper portion and a second lower portion, the second leg assembly rotatably coupled to the utility vehicle at the second upper portion;
    a second tilt actuator configured to transition the second leg assembly between the stowed configuration and the out configuration,
    wherein the second leg assembly is stowed within the maximum width and the maximum height of the utility vehicle in the stowed configuration,
    wherein the second leg assembly is rotated away from the utility vehicle in the out configuration;
    a second extension actuator configured to transition the second leg assembly between the out configuration and the fully deployed configuration,
    wherein the second leg assembly is rotated away from the utility vehicle and at least partially in contact with the ground surface in the fully deployed configuration;
    a first plurality of mount locations, each configured to be removably attached to the first upper portion of the first leg assembly and act as a first pivot point,
    wherein the first leg assembly rotates with respect to the first pivot point; and
    a second plurality of mount locations, each configured to be removably attached to the second upper portion of the second leg assembly and act as a second pivot point,
    wherein the second leg assembly rotates with respect to the second pivot point.

2. The outrigger assembly of claim 1,
    wherein the first extension actuator is configured to transition the first leg assembly between the stowed configuration and a short jack configuration,
    wherein the first leg assembly is within the maximum width of the utility vehicle and at least partially in contact with the ground surface in the short jack configuration,
    wherein the second extension actuator is configured to transition the second leg assembly between the stowed configuration and the short jack configuration, and
    wherein the second leg assembly is within the maximum width of the utility vehicle and at least partially in contact with the ground surface in the short jack configuration.

3. The outrigger assembly of claim 2,
    wherein the first leg assembly and the second leg assembly are independently controlled such that the first leg assembly and the second leg assembly transition between configurations independently.

4. The outrigger assembly of claim 1,
    wherein decreasing an effective height of the outrigger assembly increases a penetration depth of the outrigger assembly and decreases a working width of the outrigger assembly,
    wherein the penetration depth is a distance between ground level and a level of the first leg assembly and the second leg assembly when fully extended,
    wherein the working width is a width between a first foot of the first leg assembly in the fully deployed configuration and a second foot of the second leg assembly in the fully deployed configuration, and wherein increasing the effective height of the outrigger assembly decreases the penetration depth and increases the working width.

5. The outrigger assembly of claim 1,
wherein the first tilt actuator comprises a first hydraulic tilt cylinder operatively coupled to the utility vehicle and the first upper portion of the first leg assembly,
wherein the second tilt actuator comprises a second hydraulic tilt cylinder operatively coupled to the utility vehicle and the second upper portion of the second leg assembly,
wherein the first extension actuator comprises a first hydraulic extension cylinder operatively attached to the first upper portion of the first leg assembly and the first lower portion of the first leg assembly, and
wherein the second extension actuator comprises a second hydraulic extension cylinder operatively attached to the second upper portion of the second leg assembly and the second lower portion of the second leg assembly.

6. The outrigger assembly of claim 1,
wherein the first tilt actuator comprises a first motorized pivot operatively coupled to the utility vehicle and the first upper portion of the first leg assembly,
wherein the second tilt actuator comprises a second motorized pivot operatively coupled to the utility vehicle and the second upper portion of the second leg assembly,
wherein the first extension actuator comprises a first hydraulic extension cylinder operatively attached to the first upper portion of the first leg assembly and the first lower portion of the first leg assembly, and
wherein the second extension actuator comprises a second hydraulic extension cylinder operatively attached to the second upper portion of the second leg assembly and the second lower portion of the second leg assembly.

7. A system comprising:
a utility vehicle comprising a chassis, a plurality of wheels, and a cabin; and
one or more outrigger assemblies comprising:
  a middle portion;
  a first side comprising:
    a first leg assembly comprising a first upper portion and a first lower portion;
    a first tilt actuator operatively connected to the middle portion and the first upper portion of the first leg assembly; and
    a first extension actuator operatively connected to the first upper portion and the first lower portion;
  a second side comprising:
    a second leg assembly comprising a second upper portion and a second lower portion;
    a second tilt actuator operatively connected to the middle portion and the second upper portion of the second leg assembly; and
    a second extension actuator operatively connected to the second upper portion and the second lower portion,
  wherein the first leg assembly and the second leg assembly are configured to transition between a stowed configuration and a fully deployed configuration by actuating the first tilt actuator, the second tilt actuator, the first extension actuator, and the second extension actuator,
  wherein the first leg assembly and the second leg assembly are configured to transition between the stowed configuration and a short jack configuration by actuating the first extension actuator and the second extension actuator;
  a first plurality of mount locations, each configured to be removably attached to the first upper portion of the first leg assembly and act as a first pivot point, wherein the first leg assembly is configured to rotate with respect to the first pivot point; and
  a second plurality of mount locations, each configured to be removably attached to the second upper portion of the second leg assembly and act as a second pivot point, wherein the second leg assembly is configured to rotate with respect to the second pivot point,
wherein the middle portion is removably attached to the chassis of the utility vehicle.

8. The system of claim 7, further comprising:
a control panel comprising one or more controls configured to operate the one or more outrigger assemblies, the one or more controls comprising at least one of a button, a switch, a lever, a knob, a user interface, or combinations thereof.

9. The system of claim 8,
wherein the control panel is disposed within the cabin of the utility vehicle.

10. The system of claim 9,
wherein the control panel comprise a first set of controls configured to operate the first side of the one or more outrigger assemblies and a second set of controls configured to operate the second side of the one or more outrigger assemblies.

11. The system of claim 10,
wherein the first leg assembly and the second leg assembly of the one or more outrigger assemblies are configured to operate independently such that the utility vehicle is made level on a slope of up to 10 degrees.

12. The system of claim 7,
wherein the one or more outrigger assemblies have a penetration depth of up to 30 inches, and
wherein the penetration depth is a distance between ground level and a level of the first leg assembly and the second leg assembly when fully extended.

13. The system of claim 7,
wherein a width between a first foot of the first leg assembly in the fully deployed configuration and a second foot of the second leg assembly in the fully deployed configuration is up to 300 inches.

14. An outrigger assembly configured to be removably attached to a utility vehicle, the outrigger assembly comprising:
a middle portion;
a first side comprising:
  a first leg assembly comprising a first upper portion and a first lower portion;
  a first tilt actuator operatively attached to the middle portion and the first upper portion,
  wherein actuating the first tilt actuator rotates the first leg assembly with respect to a first pivot point on the first side of the middle portion; and
  a first extension actuator operatively attached to the first upper portion and the first lower portion,
  wherein actuating the first extension actuator extends the first leg assembly through linear movement of the first lower portion with respect to the first upper portion;
a second side comprising:
  a second leg assembly comprising a second upper portion and a second lower portion;

a second tilt actuator operatively attached to the middle portion and the second upper portion, wherein actuating the second tilt actuator rotates the second leg assembly with respect to a second pivot point on the second side of the middle portion; and a second extension actuator operatively attached to the second upper portion and the second lower portion, wherein actuating the second extension actuator extends the second leg assembly through linear movement of the second lower portion with respect to the second upper portion, wherein the second side is opposite the first side;

a first plurality of mount locations, each configured to be removably attached to the first upper portion of the first leg assembly and act as the first pivot point; and a second plurality of mount locations, each configured to be removably attached to the second upper portion of the second leg assembly and act as the second pivot point.

15. The outrigger assembly of claim 14, wherein the outrigger assembly is transitioned from a stowed configuration to an out configuration by actuating the first tilt actuator and the second tilt actuator, wherein the outrigger assembly is within a maximum width and a maximum height of the utility vehicle when in the stowed configuration, and wherein the outrigger assembly is not within the maximum width of the utility vehicle when in the out configuration.

16. The outrigger assembly of claim 15, wherein the outrigger assembly is transitioned from the out configuration to a fully deployed configuration by actuating the first extension actuator and the second extension actuator, and wherein the outrigger assembly is not within the maximum width and the maximum height of the utility vehicle and is in contact with a ground surface when in the fully deployed configuration.

17. The outrigger assembly of claim 16, wherein the outrigger assembly is configured to transition between a plurality of configurations between the stowed configuration and the fully deployed configuration.

18. The outrigger assembly of claim 14, wherein the outrigger assembly is transitioned from a stowed configuration to a short jack configuration by actuating the first extension actuator and the second extension actuator, wherein the outrigger assembly is within a maximum height of the utility vehicle when in the stowed configuration, and wherein the outrigger assembly is in contact with ground level when in the short jack configuration.

19. The outrigger assembly of claim 14, further comprising:

a third plurality of mount locations, each configured to be removably attached to the first tilt actuator; and a fourth plurality of mount locations, each configured to be removably attached to the second tilt actuator.

20. The outrigger assembly of claim 14, wherein the outrigger assembly has a first effective height when the first upper portion of the first leg assembly is attached to a first mount location of the first plurality of mount locations and the second upper portion of the second leg assembly is attached to a second mount location of the second plurality of mount locations, wherein the outrigger assembly has a second effective height when the first upper portion of the first leg assembly is attached to a third mount location of the first plurality of mount locations and the second upper portion of the second leg assembly is attached to a fourth mount location of the second plurality of mount locations, and wherein the second effective height is greater than the first effective height.

* * * * *